United States Patent
Asrar et al.

(10) Patent No.: US 7,836,630 B2
(45) Date of Patent: Nov. 23, 2010

(54) METHOD OF PROTECTING SEEDS TREATED WITH A PHYTOTOXIC AGENT

(75) Inventors: Jawed Asrar, Chesterfield, MO (US); Vladmir O. Bekker, Olivette, MO (US); Yiwei Ding, Ballwin, MO (US)

(73) Assignee: Monsanto Technology LLC, St. Louis, MO (US)

( * ) Notice: Subject to any disclaimer, the term of this patent is extended or adjusted under 35 U.S.C. 154(b) by 856 days.

(21) Appl. No.: 10/705,062

(22) Filed: Nov. 10, 2003

(65) Prior Publication Data

US 2004/0118040 A1 Jun. 24, 2004

Related U.S. Application Data

(60) Provisional application No. 60/430,572, filed on Dec. 3, 2002.

(51) Int. Cl.
*A01C 1/06* (2006.01)

(52) U.S. Cl. .............. 47/57.6; 47/48.1 SE; 47/DIG. 9; 47/DIG. 11

(58) Field of Classification Search .............. 47/57.6, 47/58.1 SE, DIG. 9, DIG. 11
See application file for complete search history.

(56) References Cited

U.S. PATENT DOCUMENTS

| | | | | |
|---|---|---|---|---|
| 3,113,399 | A | 12/1963 | Eversol et al. | 47/1 |
| 3,598,565 | A | 8/1971 | Graves | 71/77 |
| 3,803,761 | A | 4/1974 | Watts et al. | 47/57.6 |
| 3,905,152 | A * | 9/1975 | Loperfido | 47/57.6 |
| 3,947,996 | A * | 4/1976 | Watts | 47/57.6 |
| 3,950,891 | A | 4/1976 | Hinkes | 47/57.6 |
| 3,991,517 | A | 11/1976 | Lewis | 47/57.6 |
| 4,033,756 | A | 7/1977 | Hoffmann | 71/118 |
| 4,067,141 | A | 1/1978 | Matsunaga et al. | 47/57.6 |
| 4,068,602 | A | 1/1978 | Mickus et al. | 111/130 |
| 4,169,902 | A | 10/1979 | De Long | 427/4 |

(Continued)

FOREIGN PATENT DOCUMENTS

EP 0 091 213 A 10/1983

(Continued)

OTHER PUBLICATIONS

PCT International Search Report for PCT/US03/36178, International Filing Date Nov. 14, 2003.

(Continued)

*Primary Examiner*—Andrea M Valenti
(74) *Attorney, Agent, or Firm*—Nelson Mullins Riley & Scarborough, LLP

(57) ABSTRACT

A method of improving germination rate in pesticide-treated plant seeds involves forming a pesticide-free polymer coating on a plant seed before treating the seed with a pesticide, where the type of polymer and the coating thickness are designed to block phytotoxic contact of the pesticide with the seed while allowing sufficient transfer of oxygen to maintain the seed's viability and sufficient transfer of moisture under environmental conditions normally encountered by the seed after planting to enable its germination; and then treating the coated plant seed with a pesticide. Seeds that have been treated by this method, and plants that are grown from the treated seeds are also described.

45 Claims, 7 Drawing Sheets

U.S. PATENT DOCUMENTS

| | | | | |
|---|---|---|---|---|
| 4,238,523 | A | 12/1980 | Porter et al. | 427/4 |
| 4,245,432 | A | 1/1981 | Dannelly | 47/57.6 |
| 4,249,343 | A | 2/1981 | Dannelly | 47/57.6 |
| 4,251,952 | A | 2/1981 | Porter et al. | 47/57.6 |
| 4,272,417 | A | 6/1981 | Barker et al. | 260/22 |
| 4,344,979 | A * | 8/1982 | Gago et al. | 427/4 |
| 4,383,391 | A * | 5/1983 | Thomas et al. | 47/57.6 |
| 4,394,845 | A | 7/1983 | Porter et al. | 118/303 |
| 4,493,162 | A | 1/1985 | Langan et al. | 47/57.6 |
| 4,495,724 | A | 1/1985 | Kirkland et al. | 47/57.6 |
| 4,665,648 | A * | 5/1987 | Branco et al. | 47/57.6 |
| 4,735,015 | A | 4/1988 | Schmolka | 47/57.6 |
| 4,735,017 | A | 4/1988 | Gago et al. | 47/57.6 |
| 4,808,430 | A | 2/1989 | Jouno | 427/4 |
| 4,879,839 | A | 11/1989 | Gago et al. | 47/57.6 |
| 5,006,149 | A | 4/1991 | Kiss et al. | 71/81 |
| 5,044,116 | A | 9/1991 | Gago et al. | 47/57.6 |
| 5,087,475 | A * | 2/1992 | Bazin et al. | 427/4 |
| 5,106,648 | A | 4/1992 | Williams | 427/3 |
| 5,120,349 | A | 6/1992 | Stewart et al. | 71/93 |
| 5,127,185 | A | 7/1992 | Kojimoto et al. | 47/57.6 |
| 5,129,180 | A | 7/1992 | Stewart | 47/57.6 |
| 5,300,127 | A | 4/1994 | Williams | 47/57.6 |
| 5,328,942 | A | 7/1994 | Akhtar et al. | 524/35 |
| 5,387,450 | A | 2/1995 | Stewart | 428/40.4 |
| 5,525,131 | A | 6/1996 | Asano | 47/57.6 |
| 5,586,411 | A | 12/1996 | Gleddie et al. | 47/57.6 |
| 5,661,103 | A | 8/1997 | Harms et al. | 504/147 |
| 5,701,699 | A * | 12/1997 | Carlson et al. | 47/57.6 |
| 5,750,466 | A | 5/1998 | Wedegaertner et al. | 504/100 |
| 5,849,320 | A | 12/1998 | Turnblad et al. | 424/410 |
| 5,876,739 | A * | 3/1999 | Turnblad et al. | 424/408 |
| 5,918,413 | A | 7/1999 | Otani et al. | 47/57.6 |
| 5,939,356 | A | 8/1999 | Welinghoff | 504/100 |
| 6,096,686 | A | 8/2000 | Gressel et al. | 504/100 |
| 6,156,699 | A * | 12/2000 | Johnson et al. | 504/100 |
| 6,199,318 | B1 * | 3/2001 | Stewart et al. | 47/57.6 |
| 6,202,346 | B1 | 3/2001 | Lyons et al. | 47/57.6 |
| 6,230,438 | B1 * | 5/2001 | Zaychuk et al. | 47/57.6 |
| 6,235,916 | B1 | 5/2001 | Thames et al. | 554/219 |
| 6,261,996 | B1 * | 7/2001 | Klittich et al. | 504/100 |
| 6,329,319 | B1 * | 12/2001 | Puglisi et al. | 504/100 |

FOREIGN PATENT DOCUMENTS

| | | | |
|---|---|---|---|
| FR | 2 777 421 A | | 10/1999 |
| FR | 2777421 | | 10/1999 |
| GB | 2138291 A | * | 10/1984 |
| WO | WO 02/080675 A1 | | 10/2002 |

OTHER PUBLICATIONS

PCT International Search Report, International Filing Date Nov. 14, 2003.
Article from B-R Ni Seedbiotics, P. O. Box 609, Caldwell, ID 83605, USA, entitled Alleviation of Seed Imbibitional Chilling Injury Using Polymer Film Coating, 7 pages.
Article from the Department of Horticultural Sciences, New York State Agricultural Experiment Station, Cornell University, Geneva, NY, USA, 14456, A.G. Taylor, J. Kwiatkowski, entitled Polymer Film Coatings Decrease Water Uptake and Water Vapour Movement Into Seeds and Reduce Imbibitional Chilling Injury, 6 pages.
English abstract of Taiwan Patent No. 523394; Phinney, Robin.
Examiner's Report No. 1 dated Aug. 24, 2006 from the the Chili Patent Office for Chilean Patent Application No. 2522-03.
Response dated Apr. 28, 2008 to the Examiner's Report No. 1 as filed with the Chili Patent Office for Chilean Patent Application No. 2522-03.
Examiner's Adverse Report dated Jun. 29, 2007 from the Malaysian Patent Office for Malaysian Patent Application No. PI 200334615.
Response dated Sep. 24, 2009 to the Examiner's Adverse Report dated Jun. 29, 2007 as filed with the Malaysian Patent Office for Malaysian Patent Application No. PI 200334615.
Office Action dated Apr. 15, 2005 from the Pakistan Patent Office for Pakistan Patent Application No. 1034/2003.
Response dated Aug. 31, 2005 to the Office Action dated Apr. 15, 2005 as filed with the Pakistan Patent Office for Pakistan Patent Application No. 1034/2003.
Examiner's Report dated Jul. 9, 2007 from the India Patent Office for India National phase Patent Application No. 1107/CHENP/2005 of International Patent Application No. PCT/US03/36178, International Filing Date Nov. 14, 2003I, Entered on Jun. 2, 2005.
Response dated Sep. 26, 2007 to the Examiner's Report dated Jul. 9, 2007 as filed with the India Patent Office for India National Phase Patent Application No. 1107/CHENP/2005.
Office Action dated Jul. 28, 2009 from the Mexican Patent Office for Mexican Patent Application No. PA//2005/I005894.
Response dated Oct. 9, 2009 to the Office Action dated Jul. 28, 2009 filed with the Mexican Patent Office for Mexican Patent Application No. PA//2005/I005894.
Office Action dated Feb. 21, 2008 from the Philippines Intellectual Property Office for Philippine Patent Application No. 1 20050501049.
Response dated Apr. 18, 2008 to the Office Action dated Feb. 21, 2008 filed with the Philippine Intellectual Property Office Philippine Patent Application No. 1 20050501049.
Office Action dated Jun. 25, 2008 from the Philippines Intellectual Property Office for Philippine Patent Application No. 1 20050501049.
Response dated Aug. 21, 2008 to the Office Action dated Jun. 25, 2008 filed with the Philippine Intellectual Property Office Philippine Patent Application No. 1 20050501049.
Office Action dated Mar. 10, 2010 from the Philippines Intellectual Property Office for Philippine Patent Application No. 1 20050501049.
Office Action requiring a response no later than Apr. 1, 2008 from the Patent Office of Ukraine for Ukraine Patent Application No. 2005 06501/(MI-3330).
Response dated Apr. 1, 2008 to the Office Action requiring a response no later than Apr. 1, 2008 from the Patent Office of Ukraine for Ukraine Patent Application No. 2005 06501/(MI-3330).
Office Action requiring a response no later than Jun. 21, 2008 from the Patent Office of Ukraine for Ukraine Patent Application No. 2005 06501/(MI-3330).
Response dated Jul. 22, 2008 to the Office Action requiring a response no later than Jun. 21, 2008 from the Patent Office of Ukraine for Ukraine Patent Application No. 2005 06501/(MI-3330).
First Office Action dated Mar. 24, 2006 from the Patent Office of the People's Republic of China for Chinese Patent Application for Invention No. 200380104896.8(PCT/US2003/036178) - This Office Action was withrawn and reissued.
Reissued First Office Action dated Jul. 7, 2006 form the Patent Office of the People's Republic of China for Chinese Patent Application for Invention No. 200380104896.8(PCT/US2003/036178).
Response dated Jul. 7, 2006 to the Reissued First Office Action dated Jul. 7, 2006 filed with the Patent Office of the People's Republic of China for Chinese Patent Application for Invention No. 200380104896.8(PCT/US2003/036178).
Second Office Action dated Dec. 29, 2006 from the Patent Office of the People's Republic of China for Chinese Patent Application for Invention No. 200380104896.8(PCT/US2003/036178).
Response to the Second Office Action dated Dec. 29, 2006 filed with the Patent Office of the People's Republic of China for Chinese Patent Application for Invention No. 200380104896.8(PCT/US2003/036178).
Third Office Action dated Dec. 7, 2007 from the Patent Office of the People's Republic of China for Chinese Patent Application for Invention No. 200380104896.8(PCT/US2003/036178).
Response to the Third Office Action dated Dec. 7, 2007 filed with the Patent Office of the People's Republic of China for Chinese Patent Application for Invention No. 200380104896.8(PCT/US2003/036178).

Fourth Office Action dated Dec. 19, 2008 from the Patent Office of the People's Republic of China for Chinese Patent Application for Invention No. 200380104896.8(PCT/US2003/036178).

Response to the Fourth Office Action dated Dec. 19, 2008 filed with the Patent Office of the People'sRepublic of China for Chinese Patent Application for Invention No. 200380104896.8(PCT/US2003/036178).

Response filed Jun. 1, 2009 to the telephone message from the examiner of the Patent Office of the People's Republic of China for Chinese Patent Application for Invention No. 200380104896.8(PCT/US2003/036178).

Response filed Sep. 8, 2009 to the telephone message from the examiner of the Patent Office of the People's Republic of China for Chinese Patent Application for Invention No. 200380104896.8(PCT/US2003/036178).

Summoned to attend oral proceedings on Nov. 3, 2009 by the European Patent Office to attend oral proceedings on Mar. 11, 2009 in connection with European Patent Application No. 03768924.7-2406 / 1566996.

Minutes of the oral proceedings held Nov. 3, 2009 by the European Patent Office to attend oral proceedings on Mar. 11, 2009 in connection with European Patent Application No. 037689247-2406 / 1566996.

Response filed Feb. 10, 2009 to the European Patent Office's Summons of Oct. 28, 2008 to attend oral proceedings in connection with European Patent Application No. 03768924.7-2406 / 1566996 with a copy of the minutes of the oral proceedings attached.

Office Action dated Oct. 9, 2007 from the European Patent Office for European Patent Application No. 03 768 924.7.

Response dated Jan. 31, 2008 to the Office Action dated Oct. 10, 2007 filed with the European Patent Office for European Patent Application No. 03 768 924.7 for European Patent Application No. 03 768 924.7.

Office Action dated May 30, 2006 form the European Patent Office for European Patent Application No. 03 768 924.7 for European Patent Application No. 03 768 924.7.

Response dated Nov. 28, 2006 to the Office Action dated May 30, 2006 filed with the European Patent Office for European Patent Application No. 03 768 924.7 for European Patent Application No. 03 768 924.7.

Office Action dated Oct. 10, 2005 form the European Patent Office for European Patent Application No. 03 768 924.7 for European Patent Application No. 03 768 924.7.

Response dated Apr. 6, 2006 to the Office Action dated Oct. 10, 2005 filed with the European Patent Office for European Patent Application No. 03 768 924.7 for European Patent Application No. 03 768 924.7.

Office Action dated Jan. 4, 2009 from the Israeli Patent Office for Israeli Patent Application No. 168501.

Response dated May 4, 2009 to the Office Action dated Jan. 4, 2009 filed with the Israeli Patent Application No. 168501.

Australian Examiner's first report on Australian Patent Application No. 20033291520 dated Aug. 17, 2010, which is filed from related PCT Patent Application No. PCT/US03/36178.

* cited by examiner

METHOD OF PROTECTING SEEDS TREATED WITH A PHYTOTOXIC AGENT

CROSS REFERENCE TO RELATED PATENTS AND PATENT APPLICATIONS

This application claims the benefit of U.S. Provisional Patent Application Ser. No. 60/430,572, filed Dec. 3, 2002, which is incorporated by reference herein in its entirety.

BACKGROUND OF THE INVENTION (1) Field of the Invention

The present invention relates to a method of protecting seeds that are to be treated with a phytotoxic agent, and in particular, to a method for improving the germination rate of phytotoxic agent-treated seeds. Also included are seeds that have been treated by the subject method, and plants that grow from such seeds.

(2) Description of the Related Art

A significant fraction of plant seed is now treated with one or more agrochemicals, such as pesticides, inoculants, growth factors, and fertilizers, in order to control pests and diseases, to provide nutrients, stimulate germination, and enhance the growth of the seedling. Some of the agrochemicals that are useful in controlling pests and diseases can also be toxic to the seed and to the plant that sprouts from the seed. Such phytotoxic activity limits the amount of these agrochemicals that can safely be applied to the seed.

One undesirable effect of phytotoxicity is the reduction of the germination rate of seeds that have been treated. Typically, the germination rate of seeds that are treated with a phytotoxic agent decreases with time after the agent has been applied, thereby limiting the shelf life of the treated seeds. Sometimes extraordinary measures, such as in-field seed treatment, or treatment immediately before planting, are required to avoid serious damage to the crop. It has also been recognized that phytotoxic damage to seed by agrochemical agents may be exacerbated by exposure of the seed to environmental stresses, such as cold, drought, and the like.

Phytotoxicity of agrochemicals has been dealt with in several ways. The inclusion of safeners—chemicals which ameliorate the phytotoxic affects of agrochemicals, such as herbicides—along with the seed, is widely used, but this requires the application of an additional, often expensive, chemical component to the seed.

Another way to overcome the phytotoxic effect is to encapsulate the agrochemical agent in a matrix, often a polymer, which limits the movement of the agent. See, e.g., U.S. Pat. No. 6,329,319 to Puglisi et al. This method can limit the contact of the agent with the seed and the emerging seedling, while permitting the agent to become available later during germination and initial plant growth as the agent is released from the polymer matrix. The proper operation of encapsulation technology depends on careful matching of the physical and chemical properties of the agrochemical and the encapsulating matrix. Neither one polymer matrix, nor one encapsulation process, is suitable for encapsulation of all agrochemical agents now in use for seed treatment.

Agrochemical agents can also be included in seed coatings, which can limit the mobility of the agent. See, e.g., U.S. Pat. No. 6,199,318 to Stewart et al., U.S. Pat. No. 5,129,180 to Stewart, U.S. Pat. No. 5,127,185 to Kojimoto et al., U.S. Pat. No. 5,044,116 to Gago et al., and U.S. Pat. No. 3,947,906 to Watts. However, because the active agent is distributed throughout the coating, some finite amount of the agent, by necessity, comes in contact with the surface of the seed. Moreover, like encapsulation, the chemical and physical parameters of the matrix material must be matched with the properties of the active agent in order to obtain the proper homogeneity for the coating and to avoid cracking.

It is known to apply polymer coatings to seeds for the purpose of reducing imbibitional chilling injury. See, Ni, B—R, Alleviation of seed imibitional chilling injury using polymer film coating, *British Crop Protection Council Symposium Proceedings*, No. 76, Pp. 73-82 (2001); also, Taylor, A. G., *Bean Improvement Cooperative*, 30.30-31 (1987); Taylor et al., *J. Horticultural Sci.*, 62:183-189 (1987); Taylor, A. G. and J. Kwiatkowski, Polymer film coatings decrease water uptake and water vapor movement into seeds and reduce imbibitional chilling injury, West et al., *Crop Science*, 25:941-944 (1985). But the combination of such coatings with subsequent seed treatment with phytotoxic agrochemicals was not described.

It would be useful, therefore, to provide a method for reducing phytotoxic injury to seeds from phytotoxic seed treatment agents, which method can be used with a broad range of agrochemical agents and applied to a broad range of seed types.

SUMMARY OF THE INVENTION

Briefly, therefore the present invention is directed to a novel method of improving the germination rate of plant seeds which are treated with a phytotoxic agent, the method comprising: forming a polymer coating on the plant seed before treating the seed with the phytotoxic agent, where the coating is free of the phytotoxic agent and where the type of polymer and the coating thickness are designed to block phytotoxic contact of the phytotoxic agent with the seed while allowing sufficient transfer of oxygen to maintain the seed's viability and sufficient transfer of moisture under environmental conditions normally encountered by the seed after planting to enable its germination; and treating the coated plant seed with the phytotoxic agent.

The present invention is also directed to a novel phytotoxic agent-treated plant seed having an improved germination rate, each seed comprising a plant seed having a phytotoxic agent deposited thereupon, and having a polymer coating which is free of the phytotoxic agent located between the seed and the phytotoxic agent, wherein the type of polymer and the coating thickness are designed to block phytotoxic contact of the phytotoxic agent with the seed while allowing sufficient transfer of oxygen and moisture under environmental conditions normally encountered by the seed after planting to maintain the seed's viability and enable its germination.

The present invention is also directed to a novel plant that is grown from a seed that is treated by the method described above.

The present invention is also directed to a novel method of producing an agronomic crop, the method comprising the steps:

a. providing plant seeds of the agronomic crop that have been treated by the method described above;

b. planting the seeds; and c. cultivating the planted seeds and plants that sprout from the seeds.

Among the several advantages found to be achieved by the present invention, therefore, may be noted the provision of a method for reducing phytotoxic injury to seeds from phytotoxic seed treatment agents, which can be used with a broad range of agrochemical agents and applied to a broad range of seed types.

DETAILED DESCRIPTION OF THE PREFERRED EMBODIMENTS

Figure 1:
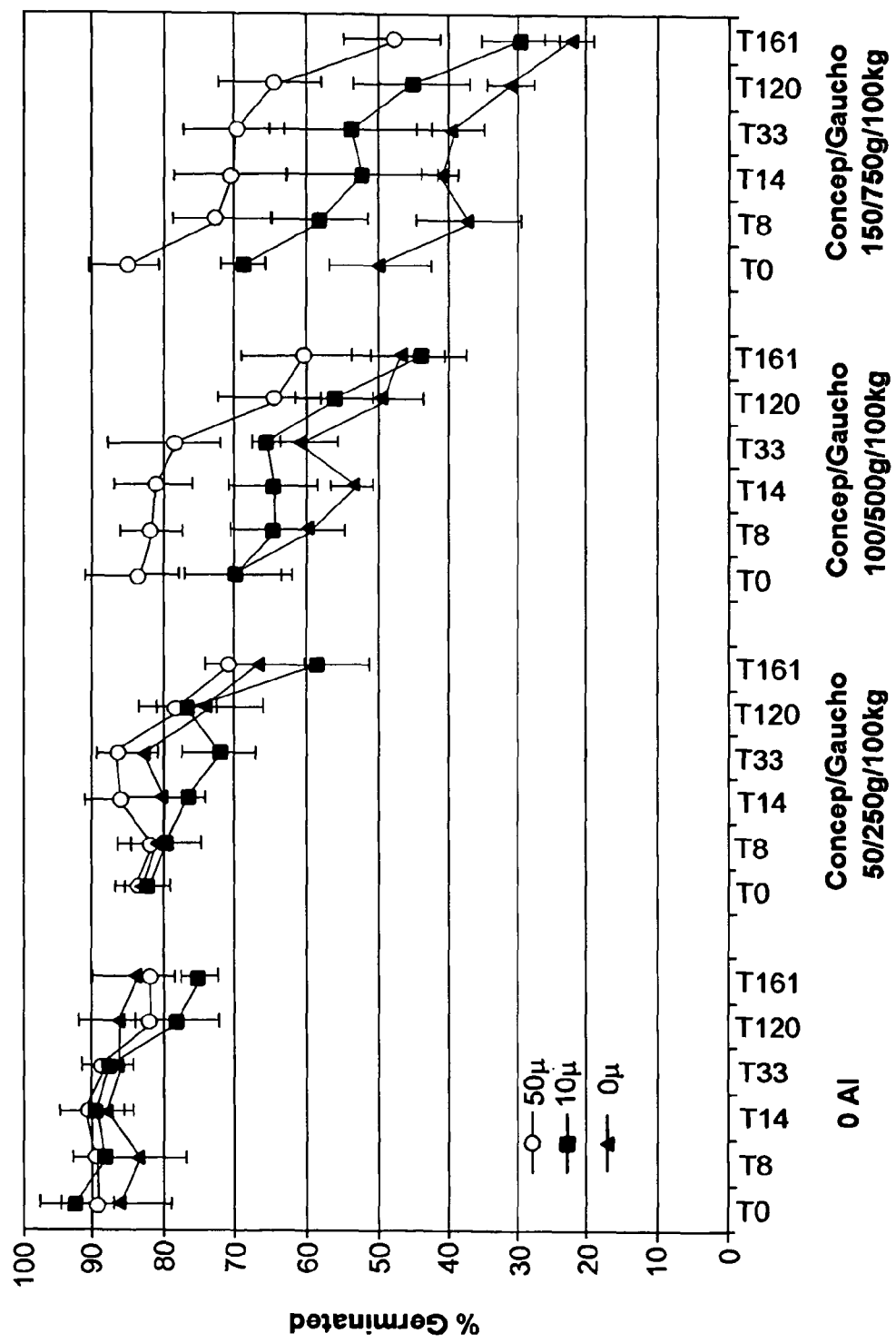
FIG. 1 is a graph showing the germination rate of sorghum seeds in a warm germination test as a function of days after treatment, for seeds having no coating and having 10μ and 50μ coatings of Vinac XX-210 polymer followed by treatment with a ConcepIII safener and with imidacloprid at levels of 0, 250 g, 500 g, and 750 g per 100 kg of seeds.

In accordance with the present invention, it has been discovered that the germination rate of seeds that are to be treated with a phytotoxic agent can be improved by forming a polymer coating, which is free of the phytotoxic agent, on a plant seed, and then treating the seeds with the agent. It is important that the type of polymer that is employed for the coating, and the coating thickness, are designed to block phytotoxic contact of the agent with the seed while allowing sufficient transfer of oxygen to maintain the seed's viability and sufficient transfer of moisture under environmental conditions normally encountered by the seed after planting to enable its germination.

In the present method, the terms "phytotoxic agent" refer to an agricultural active ingredient that is phytotoxic. As used herein, the terms "agricultural active ingredient" mean any chemical element, molecule, or compound, or mixture thereof, which has a biological activity in a seed, a plant, or a disease or pest of a seed or plant. Such agricultural active ingredients include, but are not limited to, pesticides, herbicides, fertilizers, plant growth regulators, drugs, dyes, biological attractants, scents and pheromones. Therefore, pesticides, herbicides, fertilizers, plant growth regulators, drugs, dyes, biological attractants, scents and pheromones that are phytotoxic are to be included as the phytotoxic agents of the present invention.

As used herein, an agent is "phytotoxic" if it causes harm or damage to a plant or seed with which it comes in contact. Plant and seed damage or harm includes, for example, stunting, chemical burning, yield depression, malformation, discoloration, lack of germination, reduction in germination rate, death, and the like.

The subject method has been found to be especially useful when the phytotoxic agent is a plant growth regulator, a pesticide, or a herbicide. Examples of pesticides that can be used as the phytotoxic agent in the present invention are acaricides, miticides, insecticides, insect repellants, fungicides, fungistats, molluscicides, rodenticides, nematicides, and bactericides.

It is known that many of the most useful pesticides, herbicides and plant growth regulators can be phytotoxic if they are allowed to contact plants or seeds, and particularly if they are present in high concentrations. Nonetheless, it is often more effective, if not necessary, to provide such agents at high concentrations in order to obtain the maximum benefits that they can offer. Consequently, it has been particularly difficult to supply these phytotoxic agents in concentrated form, such as in controlled release granules, coatings, or pellets, due to the harmful effect that the agent can have upon the very seed or plant that it is designed to protect. An important property of the present invention is that it permits the use of highly effective actives that are also phytotoxic. Moreover, the actives can be used at concentrations that are higher than would be possible without the use of the phytotoxic agent-free polymer coating.

One function of the polymer coating is to reduce phytotoxic contact of the phytotoxic agent with the seed. As used herein, the terms "phytotoxic contact" means contact of an amount of an agent with a seed that is sufficient to cause a phytotoxic effect. Because the phytotoxic agent-free polymer coating reduces phytotoxic contact of the agent with the seed, it extends the time that treated seed can be stored. Also, the treatment can be carried out at a time well before the seed is planted, preferably at a time that is economically attractive and convenient for the person applying the treatment. By way of example, when seeds are to be treated with a pesticide, the present method can extend the shelf life of pesticide-treated seeds by a factor of three times, or even more. Furthermore, the present method makes it possible to treat seeds with significantly higher levels of pesticides than can normally be used without incurring unacceptably low germination rates. This can enhance the effectiveness of the pesticide, and extend the time that the pesticide remains active after planting. For example, the present method permits the use of two-times, three times, or even higher levels of pesticide, without incurring additional reduction in germination rates for treated seeds.

It is another advantage of the present method that it can be used with a broad range of agrochemical agents, irrespective of their chemical or physical compatibility with the coating polymer. The aspect of applying a phytotoxic agent-free polymer coating to the seed before applying a phytotoxic agent eliminates the need for careful matching of the properties of the polymer and the agent.

In the present method, when it is said that a purpose is "improving the germination rate" of plant seed, it is meant that plant seed that have been treated by the present method have a higher germination rate than similar plant seed that have been treated with the same amount and type of phytotoxic agent, but lack the phytotoxic agent-free polymer coating that is a feature of the present method, when both types of seeds are exposed to the same environmental conditions and tested under the same protocol for the measurement of germination rate. Methods for the measurement of germination rate are well known to those having skill in the art of seed science, and are described in more detail below.

In the present method, a phytotoxic agent-free polymer coating is formed on a plant seed before treating the seed with the phytotoxic agent. The type of polymer and the coating thickness are designed to reduce phytotoxic contact of the phytotoxic agent with the seed while allowing sufficient transfer of oxygen to maintain the seed's viability and sufficient transfer of moisture under environmental conditions normally encountered by the seed after planting to enable its germination. After the polymer coating has been formed, the coated seed is treated with a phytotoxic agent. In preferred embodiments, the phytotoxic agent is a pesticide.

Although the subject method can be used to treat the seed of any type of plant, it is preferred that the seed is the seed of an agronomic plant. As those terms are used herein, "agronomic plant" refers to any plant that is cultivated by man, or from which is harvested parts or products that are used by man. Agronomic plants can be a gymnosperm, a dicotyledon, or a monocotyledon.

Examples of agronomic plants which are useful in the present invention include, without limitation, cereals (wheat, barley, rye, oats, rice, sorghum, related crops, etc.), beet, pear-like fruits, stone fruits, and soft fruits (apple, pear, plum, peach, Japanese apricot, prune, almond, cherry, strawberry, raspberry, black berry, tomato, pepper, etc.), legumes (kidney bean, lentil, pea, soybean), oil plants (rape, canola, mustard, poppy, olive, sunflower, coconut, castor, cocoa bean, peanut, soybean, corn, etc.), Cucurbitaceae (pumpkin, cucumber, melon, etc.), citrus (orange, lemon, grape fruit, mandarin, Watson pomelo (citrus natsudaidai), etc.), vegetables (lettuce, cabbage, celery cabbage, Chinese radish, carrot, onion, potato, etc.), camphor trees (avocado, cinnamon, camphor, etc.), corn, tobacco, nuts, coffee, sugar cane, tea, grapevine, hop and banana.

In preferred embodiments, the agronomic plant can be rice, wheat, barley, rye, corn, potato, carrot, sweet potato, sugar beet, bean, pea, chicory, lettuce, cabbage, cauliflower, broccoli, turnip, radish, spinach, asparagus, onion, garlic, eggplant, pepper, celery, canot, squash, pumpkin, zucchini, cucumber, apple, pear, quince, melon, plum, cherry, peach, nectarine, apricot, strawberry, grape, raspberry, blackberry, pineapple, avocado, papaya, mango, banana, soybean, tomato, sorghum and raspberries, banana and other such edible varieties. It is more preferred that the agronomic plant is selected from corn, soybeans, cotton, sorghum, rape (canola), rice, wheat, barley, and rye. It is even more preferred that the agronomic plant is corn, soybeans, or cotton.

An initial step in the present method is forming a phytotoxic agent-free polymer coating on a seed. Any method that is known in the art of polymer science can be used to accomplish the formation of the coating on the seed. In one preferred method, the coating can be formed by providing a seed, and contacting the seed with a polymer. The contacting can be carried out in any one of several ways. For example, if the polymer is water soluble, a water solution of the polymer can be prepared and the polymer solution can be applied to the seed—such as by spraying, dipping, misting, or the like. For non-water soluble polymers, a liquid/polymer emulsion of the polymer can be formed, and the emulsion can be applied to the seed. It is preferred that the liquid in which the emulsion is formed is water, and, in that case, the emulsion can be referred to as a polymer latex. It is an important feature of the present method that the polymer-containing medium that is used for the application of the polymer to the seed is free of a phytotoxic agent in order that the application of the polymer to the seed results in the formation of a phytotoxic agent-free polymer coating on the seed.

When it is said that the polymer-containing medium, or the polymer coating, are "free of a phytotoxic agent", it is meant that any phytotoxic agent that might be present in the medium or the coating is present at a concentration that is below a phytotoxic level. The concentration of a phytotoxic agent is considered to be "below a phytotoxic level" if seed coated with a polymer coating containing the phytotoxic agent provide a warm-germ test germination rate at 30 days (as that test is described below) that is not more than 5% lower than the warm-germ test germination rate of similar seed having a similar polymer coating in which the concentration of the phytotoxic agent is zero.

In preferred embodiments, the polymer coating is applied directly to the seed without intervening material between the coating and the seed.

It is preferred that the polymer of the subject coating be applied to the seed in the form of a film of a liquid suspension, dispersion or emulsion. As used herein, when describing the coating the term "emulsion" will be understood to include all suspensions, dispersions and emulsions. When the liquid in which the polymer is distributed is water, the emulsion can be termed a latex. It will be understood that when the term "film" is used in this specification, it generally applies to the film of the polymer emulsion in liquid form after application to the seed, unless the context suggests otherwise. Likewise, the term "coating" applies to the coating on the seed that is formed from the curing of the film. When a film containing the polymer is applied to the seed, it is preferred that the film substantially covers the surface of the seed. However, while preferable, such substantial coverage is not required in order to obtain the advantages of the invention.

The polymer is added to the liquid under conditions that an emulsion is formed. This can be done by the addition of finely milled particles of the polymer to the liquid, or a liquid/polymer mixture can be subjected to high shear to form the emulsion. Such emulsion-forming techniques are well-known in the art.

The polymer can be added to the liquid in any amount, but the concentration of the polymer in the emulsion that is used to form the film should be low enough to permit easy handling and application of the emulsion to the seed—such as by spraying—and thorough distribution of the film among the seeds so that the outer surface of each seed is substantially covered. However, the concentration should be high enough, when used in combination with the other parameters of seed treatment, to avoid the loss of polymer from the seeds by dripping or pooling of the emulsion. It is preferred that the concentration of polymer in the emulsion at the time that a film of the emulsion is applied to the seeds is about 0.5% to about 50%, by weight, more preferred is a concentration of about 0.5% to about 20%, by weight, even more preferred is a concentration of about 2% to about 20%, yet more preferred is a concentration of about 4% to about 15%, by weight, and even more preferred is a concentration of about 5% to about 11%, by weight.

The amount of the polymer emulsion or polymer solution that is added to the seeds is an amount that is sufficient to provide a coating of the desired thickness. After the film of the polymer emulsion or solution has been applied to the seed, it is cured to form the polymer coating. When it is said that the film is "cured", or when "curing the film" is referred to, what is meant is that a solid coating of the polymer is formed from the polymer in the film. Curing is often the result of drying of the liquid from the film, but can also be carried out by chemical reaction, adsorption, sequestration, or other forms of polymer curing that are known in the art.

The subject coating is insoluble in water, as described above, and is present on at least some part of the outer surface of each seed. It is preferred that the coating completely cover the outer surface of each seed.

It is preferred that the polymer coating that is formed on the seed comprises a substantial amount of the polymer. It is preferred that—after the coating is cured—the polymer coating contains a polymer, or blend of polymers, in an amount of over 10% by weight. An amount of 50% by weight is more preferred; 70% by weight is yet more preferred, and 80% by weight is even more preferred. In some instances, it is preferred that the coating consists essentially of the polymer.

If it is desirable, the coating can contain non-phytotoxic materials other than the polymer in order to serve as plasticizers, emulsifiers, stabilizers, fillers, dyes, safeners, and the like. Such materials are well known in the art.

A feature of the phytotoxic agent-free polymer coating is that the type of polymer and the coating thickness are designed to reduce phytotoxic contact of the phytotoxic agent with the seed while allowing sufficient transfer of oxygen and moisture under environmental conditions normally encountered by the seed after planting to maintain the seed's viability and enable its germination.

The types of polymer that are useful for the present coating include polymers that can be processed into an aqueous solution and polymers that can be processed into an aqueous latex emulsion. Polymers that form aqueous latex emulsions are preferred. It is preferred that the polymers that are used in the present coating can form a film that has good adhesion to the surface of the seed—that is, the cured film adheres sufficiently tightly to the surface of the seed that it does not detach or abrade away during normal processing, storage and handling. It is further preferred that the polymers form films that are water insoluble, but have sufficient permeability to moisture and oxygen to maintain seed viability and permit germination when the seed is planted.

Furthermore, it is preferred that the polymer that is used for the present coating be one having a minimum film-forming temperature (MFT) that is lower than a temperature that would harm the seeds being coated. It is preferred that the polymer have a MTF of lower than 55° C., more preferred of lower than 30° C., and even more preferred of lower than 25° C. Minimum film-forming temperature can be determined according to ASTM procedure No. D-2354. See, e.g., U.S. Pat. No. 6,235,916 B1. In a preferred embodiment, the present method of coating the seed includes exposing the seed to a temperature that is higher than the MTF of the coating polymer in order to obtain an adherent and uniform film having few or no pinholes.

Examples of the types of polymers that can be used in the present invention include water soluble polymers, such as maltodextrins, methylcellulose, ethylcellulose, hydroxypropylcellulose, and hydroxypropyl/methylcellulose, and water dispersible polymers, such as vinyl acetate-ethylene polymers, ethylene-vinyl chloride polymers, vinyl acetate polymers, vinyl-acrylic polymers, starch-based polymers (such as SB-2000), polyvinyl acetate -vinyl chloride polymers, vinyl chloride/vinyl acetate/ethylene copolymers, and the like.

A polymer that is useful in the present method is SB 2000, a starch-based functional polymer (available from Seedbiotics, Caldwell, Id.), which has been reported to reduce imbibitional chilling injury to seeds when used as a seed coating prior to planting. (See, e.g., Taylor, A. G., et al., Polymer film coatings decrease water uptake and water vapour movement into seeds and reduce imbibitional chilling injury, *British Crop Protection Council Symposium Proceedings* No. 76. p. 215-220 (2001); and Ni, B—R, pp. 73-82, in *British Crop Protection Council Symposium Proceedings*, No. 76 (2001)).

Other polymers that are suitable for use in the subject method include polymers that can provide temperature-sensitive water permeability, of the type described in U.S. Pat. Nos. 5,120,349, 5,129,180, and 5,387,450.

As described above, the thickness of the phytotoxic agent-free polymer coating, in combination with the type of polymer that is used, is designed to restrict the contact of the phytotoxic agent with the seed, but to permit a certain level of moisture and oxygen transfer. The thickness of the phytotoxic agent-free polymer coating refers to the thickness of the polymer coating after it has been cured or dried to form a film. In other words, it refers to the thickness of the final coating, rather than to the coating of the polymer-containing solution or emulsion that is applied to the seed.

It has been found that the thickness of the polymer coating in the present invention should be less than about 500 microns. It is preferred that the coating thickness is between about 1 micron and about 500 microns, more preferred is between about 1 micron and about 480 microns, yet more preferred is between about 2 microns and about 400 microns, even more preferred is a coating thickness of between about 3 microns and about 300 microns, yet more preferred is between about 5 microns and about 200 microns, even more preferred is a coating thickness of between about 8 microns and about 100 microns, and yet more preferred is between about 10 microns and about 50 microns.

After a polymer coating has been formed on the seed, the coated seed is then treated with a phytotoxic agent. In the present invention, the phytotoxic agent can be any phytotoxic material that is applied to a seed, including, but not limited to, pesticides, fertilizers, growth factors, dyes, and combinations thereof.

In preferred embodiments, the phytotoxic agent comprises one or more pesticides.

Examples of pesticides that are useful in the present method include herbicides, molluscicides, insecticides, nematocides, acaricides, fungicides, bactericides, and mixtures thereof.

The pesticide can be selected from pyrethrins, synthetic pyrethroids, azoles, oxadizine insecticides, neonicotinoids, diazoles, triazoles, strobilurin derivatives, organophosphates, pyrrols, pyrazoles, phenyl pyrazoles, diacylhydrazines, biological/fermentation products, carbamates, and mixtures thereof.

Examples of the types of materials that are useful as pesticides in the present method include:

a. a pyrethroid or synthetic pyrethrin. Examples of pyrethrins that are useful include 2-allyl-4-hydroxy-3-methyl-2-cyclopenten-1-one ester of 2,2-dimethyl-3-(2-methylpropenyl)-cyclopropane carboxylic acid, (2-methyl-1-propenyl)-2-methoxy-4-oxo-3-(2-propenyl)-2-cyclopenten-1-yl ester and mixtures of cis and trans isomers thereof. Examples of pyrethroids that are useful include (s)-cyano(3-phenoxyphenyl)methyl-4-chloro alpha (1-methylethyl)benzeneacetate (fenvalerate, CAS RN 51630-58-1), (S)-cyano-(3-phenoxyphenyl)methyl (S)-4-chloro-alpha-(1-methylethyl)benzeneacetate (esfenvalerate, CAS RN 66230-04-4), (3-phenoxyphenyl)-methyl(+)cis-trans-3-(2,2-dichoroethenyl)-2,2-dimethylcyclopropanecarboxylate (permethrin, CAS RN 52645-53-1), (±) alpha-cyano-(3-phenoxyphenyl)methyl(+)-cis,trans-3-(2,2-dichloroethenyl)-2,2-dimethyl-cyclopropane carboxylate (cypermethrin, CAS RN 52315-07-8), (beta-cypermethrin, CAS RN 65731-84-2), (theta cypermethrin, CAS RN 71697-59-1), S-cyano (3-phenoxyphenyl) methyl (±) cis/trans 3-(2,2-dichloroethenyl) 2,2 dimethylcyclopropane carboxylate (zeta-cypermethrin, CAS RN 52315-07-8), (s)-alpha-cyano-3-phenoxybenzyl (1R,3R)-3-(2,2-dibromovinyl)-2,2-dimethylcyclopropanecarboxylate (deltamethrin, CAS RN 52918-63-5), alpha-cyano-3-phenoxybenzyl 2,2,3,3,-tetramethyl cyclopropoanecarboxylate (fenpropathrin, CAS RN 64257-84-7), (RS)-alpha-cyano-3-phenoxybenzyl(R)-2-[2-chloro-4-(trifluoromethyl)anilino]-3-methylbutanoate (tau-fluvalinate, CAS RN 102851-06-9), (2,3,5,6-tetrafluoro-4-methylphenyl)methyl-(1-alpha, 3-alpha)-(Z)-(±)-3-(2-chloro-3,3,3-trifluoro-1-propenyl)-2,2-dimethylcyclopropanecarboxylate (tefluthrin, CAS RN 79538-32-2), (±)-cyano (3-phenoxyphenyl)methyl (±)-4-(difluoromethoxy)-alpha-(1-methyl ethyl)benzeneacetate (flucythrinate, CAS RN 70124-77-5), cyano(4-fluoro-3-phenoxyphenyl)methyl 3-[2-chloro-2-(4-chlorophenyl)ethenyl]-2,2-dimethylcyclopropanecarboxylate (flumethrin, CAS RN 69770-45-2), cyano(4-fluoro-3-phenoxyphenyl) methyl 3-(2,2-dichloroethenyl)-2,2-dimethyl-cyclopropanedarboxylate (cyfluthrin, CAS RN 68359-37-5), (beta cyfluthrin, CAS RN 68359-37-5), (transfluthrin, CAS RN 118712-89-3), (S)-alpha-cyano-3-phenoxybenzyl(Z)-(1R-cis)-2,2-dimethyl-3-[2-(2,2,2-trifluoro-trifluoromethyl-ethoxycarbonyl)vinyl]cyclopropane carboxylate (acrinathrin, CAS RN 101007-06-1), (1R cis) S and (1S cis) R enantiomer isomer pair of alpha-cyano-3-phenoxybenzyl-3-(2,2-dichlorovinyl)-2,2-dimethylcyclopropane carboxylate (alpha-cypermethrin, CAS RN 67375-30-8), [1R,3S)3(1'RS)(1',2',2',2'-tetrabromoethyl)]-2,2-dimethylcyclopropanecarboxylic acid (s)-alpha-cyano-3-phenoxybenzyl ester (tralomethrin, CAS RN 66841-25-6), cyano-(3-phenoxyphenyl) methyl 2,2-dichloro-1-(4-ethoxyphenyl)cyclopropane carboxylate (cycloprothrin, CAS RN 63935-38-6), [1α,3α(Z)]-(±)-cyano-(3-phenoxyphenyl)methyl 3-(2-chloro-3,3,3-trifluoro-1-propenyl)-2,2-dimethylcyclopropanecarboxylate (cyhalothrin, CAS RN 68085-85-8), [1-alpha (s), 3-alpha(z)]-cyano(3-phenoxyphenyl)methyl-3-(2-chloro-3,3,3-trifluoro-1-propenyl)-2,2-dimethylcyclopropanecarboxylate (lambda cyhalothrin, CAS RN 91465-08-6), (2-methyl-[1,1'-biphenyl]-3-yl)methyl-3-(2-chloro-3,3,3-trifluoro-1-propenyl)-2,2-dimethyl-cyclopropanecarboxylate (bifenthrin, CAS RN 82657-04-3), 5-1-benzyl-3-furylmethyl-d-cis(1R,3S, E)2,2-dimethyl-3-(2-oxo,-2,2,4,5 tetrahydro thiophenylidenemethyl)cyclopropanecarboxylate (kadethrin, RU15525, CAS RN 58769-20-3), [5-(phenylmethyl)-3-furanyl]-3-furanyl-2,2-dimethyl-3-(2-methyl-1-propenyl)cyclopropane carboxylate (resmethrin, CAS RN 10453-86-8), (1R-trans)-[5-(phenylmethyl)-3-furanyl]methyl 2,2-dimethyl-3-(2-methyl-1-propenyl)cyclopropanecarboxylate (bioresmethrin, CAS RN 28434-01-7), 3,4,5,6-tetrahydro-phthalimidomethyl-(1RS)-cis-trans-chrysanthemate (tetramethrin, CAS RN 7696-12-0), 3-phenoxybenzyl-d,l-cis,trans 2,2-dimethyl-3-(2-methyl-propenyl)cyclopropane carboxylate (phenothrin, CAS RN 26002-80-2); (empenthrin, CAS RN 54406-48-3); (cyphenothrin; CAS RN 39515-40-7), (prallethrin, CAS RN 23031-36-9), (imiprothrin, CAS RN 72963-72-5), (RS)-3-allyl-2-methyl-4-oxcyclopent-2-enyl-(1S,3R; 1R,3S)-2,2-dimethyl-3-(2-methylprop-1-enyl)cyclopropanecarboxylate (allethrin, CAS RN 584-79-2), (bioallethrin, CAS RN 584-79-2), and (ZXI8901, CAS RN 160791-64-0). In preferred embodiments the pyrethroid comprises tefluthrin, lambda cyhalothrin, bifenthrin, permethrin, or cyfluthrin.

b. an oxidiazine insecticide, such as 5-(2-chloropyrid-5-ylmethyl)-3-methyl-4-nitroiminoperhydro-1,3,5-oxadiazine, 5-(2-chlorothiazol-5-ylmethyl)-3-methyl-4-nitroiminoperhydro-1,3,5-oxadiazine, 3-methyl-4-nitroimino-5-(1-oxido-3-pyridinomethyl)perhydro-1,3,5-oxadiazine, 5-(2-chloro-1-oxido-5-pyridiniomethyl)-3-methyl-4-nitroiminoperhydro-1,3,5-oxidiazine; or 3-methyl-5-(2-methylpyrid-5-ylmethyl)-4-nitroiminoperhydro-1,3,5-oxadiazine.

c. a neonicotinoid. Examples of useful neonicotinoid pesticides include thiamethoxam (CAS RN 153719-23-4), acetamiprid ((E)-N-[(6-chloro-3-pyridinyl)methyl]-N'-cyano-N-methyleneimidamide, CAS RN 135410-20-7), imidacloprid (1-[(6-chloro-3-pyridinyl)methyl]-N-nitro-2-imidazolidinimime, CAS RN 138261-41-3), nitenpyram (N-[(6-chloro-3-pyridinyl)methyl]-N-ethyl-N'-methyl-2-nitro-1,1-ethenediamine, CAS RN 120738-89-8), clothianidin (TI-435 (N-[(2-chloro-5-thiazoyl)methyl]-N'-methyl-N"-nitro,[C(E)]-(9Cl)-guanidine, CAS RN 210880-92-5). In other preferred embodiments, the pesticide comprises a neonicotinoid insecticide, such as imidacloprid, thiamethoxam, clothianidin, dinotefuran, flonicamid, nithiazine, or thiacloprid.

d. a pyrrol, pyrazole, or phenyl pyrazole, such as chlorfenapyr (4-bromo-2-(4-chlorophenyl)-1-ethoxymethyl-5-trifluoromethylpyrrole-3-carbonitrile, CAS RN 122453-73-0), fenpyroximate ((E)-1,1-dimethylethyl-4[[[[(1,3-dimethyl-5-phenoxy-1H-pyrazole-4-yl)methylene]amino]oxy]methyl] benzoate, CAS RN 111812-58-9), tebufenpyrad (4-chloro-N [[4-1,1-dimethylethyl)phenyl]methyl]-3-ethyl-1-methyl-1H-pyrazole-5-carboxamide, CAS RN 119168-77-3), or fipronil (5-amino-[2,6-dichloro-4-(trifluoromethyl)phenyl]-4-[(1R,S)-(trifluoromethyl)sulfinyl]-1H-pyrazole-3-carbonitrile, CAS RN 120068-37-3).

e. a diacylhydrazine, such as halofenozide (4-chlorobenzoate-2-benzoyl-2-(1,1-dimethylethyl)-hydrazide, CAS RN 112226-61-6), methoxyfenozide (RH-2485; N-tert-butyl-N'-(3-methoxy-o-toluoyl)-3,5-xylohydrazide, CAS RN 161050-58-4), or tebufenozide (3,5-dimethylbenzoic acid 1-(1,1-dimethylethyl)-2-(4-ethylbenzoyl)hydrazide, CAS RN 112410-23-8).

f. a triazole, such as amitrole (CAS RN 61-82-5) and riazamate (ethyl-[[1-[(dimethylamino)carbonyl]-3-(1,1-dimethylethyl)-1H-1,2,4-triazol-5-yl]thio]acetate, CAS RN 112143-82-5).

g. a biological/fermentation products selected from the group consisting of avermectin (abamectin, CAS RN 71751-41-2) and spinosad (XDE-105, CAS RN 131929-60-7).

h. an organophosphate insecticide selected from the group consisting of acephate (CAS RN 30560-19-1), chlorpyrifos (CAS RN 2921-88-2), chlorpyrifos-methyl (CAS RN 5598-13-0), diazinon (CAS RN 333-41-5), fenamiphos (CAS RN 22224-92-6), and malathion (CAS RN 121-75-5).

i. a carbamate insecticide selected from the group consisting of aldicarb (CAS RN 116-06-3), carbaryl (CAS RN 63-25-2), carbofuran (CAS RN 1563-66-2), oxamyl (CAS RN 23135-22-0) and thiodicarb (CAS RN 59669-26-0).

j. a fungicide, such as a triazole fungicide selected from the group consisting of amitrol, azaconazole, bitertanol, bromuconazole, climbazole, clotrimazole, cyproconazole, diclobutrazol, difenoconazole, diniconazole, diniconazole-M, epoxiconazole, etaconazole, fenbuconazole, fluquinconazole, fluotrimazole, flusilazole, flutriafol, furconazole, furconazole-cis, hexaconazole, imibenconazole, ipconazole, metconazole, myclobutanil, paclobutrazol, penconazole, propiconazole, quinconazole, simeconazole, tebuconazole, tetraconazole, triadimefon, triadimenol, triazbutil, triticonazole, 1-(4-fluorophenyl)-2-(1H-1,2,4-triazole-1-yl)ethanone, and mixtures thereof.

k. a fungicide, such as fluquinconazole, simeconazole, tebuconazole, tetraconazole, triticonazole, 1-(4-fluorophenyl)-2-(1H-1,2,4-triazole-1-yl)ethanone, or mixtures thereof. In particular, the fungicide can be fluquinconazole, simeconazole, tebuconazole, tetraconazole, triticonazole, or 1-(4-fluorophenyl)-2-(1H-1,2,4-triazole-1-yl)ethanone.

l. a fungicide, such as a diazole selected from the group consisting of imazalil, oxpoconazole, pefurazoate, prochloraz, trifulmizole, and mixtures thereof.

m. a strobilurin type fungicide, such as azoxystrobin, dimoxystrobin, famoxadone, kresoxim-methyl, metominostrobin, picoxystrobin, pyraclostrobin, trifloxystrobin, or mixtures thereof.

In preferred embodiments, the fungicide can be tebuconazole, simeconazole, fludioxonil, fluquinconazole, difenoconazole, 4,5-dimethyl-N-(2-propenyl)-2-(trimethylsilyl)-3-thiophenecarboxamide (silthiofam), hexaconazole, etaconazole, propiconazole, triticonazole, flutriafol, epoxiconazole, fenbuconazole, bromuconazole, penconazole, imazalil, tetraconazole, flusilazole, metconazole, diniconazole, myclobutanil, triadimenol, bitertanol, pyremethanil, cyprodinil, tridemorph, fenpropimorph, kresoxim-methyl, azoxystrobin, ZEN90160, fenpiclonil, benalaxyl, furalaxyl, metalaxyl, R-metalaxyl, orfurace, oxadixyl, carboxin, prochloraz, trifulmizole, pyrifenox, acibenzolar-S-methyl, chlorothalonil, cymoaxnil, dimethomorph, famoxadone, quinoxyfen, fenpropidine, spiroxamine, triazoxide, BAS50001F, hymexazole, pencycuron, fenamidone, guazatine, or cyproconazole. In more preferred embodiments, the fungicide comprises silthiofam.

When a pesticide is described herein, it is to be understood that the description is intended to include salt forms of the pesticide as well as any isomeric and/or tautomeric form of the pesticide that exhibits the same activity as the form of the pesticide that is described.

The pesticides that are useful in the present method can be of any grade or purity that pass in the trade as such pesticide. Other materials that accompany the pesticides in commercial preparations as impurities can be tolerated in the subject methods and compositions, as long as such other materials do not destabilize the composition or significantly reduce or destroy the activity of any of the pesticide components against a target pest(s). One of ordinary skill in the art of the production of pesticides would be able to readily identify those impurities that can be tolerated and those that cannot.

The phytotoxic agents that are useful in the present invention can be provided in solid or liquid form, and can be provided as emulsions, dispersions, solutions, or in particulate form. The phytotoxic agents can be alone or can be in combination with other materials, as long as such other materials do not destabilize, or significantly reduce or destroy the activity of the agent.

The phytotoxic agent-free polymer coated seed can be treated with the phytotoxic agent, such as a pesticide, by any method that is commonly known or used for treating seeds with a pesticide.

When the phytotoxic agent is a pesticide, the amount of the pesticide that is applied to the seed can be any amount, but is preferably between about 0.5 gm of the pesticide active ingredient/100 kg of seed and about 2,000 gm/100 kg of seed; more preferably between about 25 gm and about 1,000 gm/100 kg of seed, and even more preferably between about 100 gm and about 800 gm/100 kg of seed.

The phytotoxic agent can be applied to the seed in any form and such forms as capsule suspensions (CS), emulsifiable concentrates (EC), emulsions in oil or water (EO and EW), granules (GR), suspension concentrates (SC), soluble granules (SG), soluble concentrates (SL), soluble powders (SP), and water dispersible granules (WG) are suitable. It is preferred to apply the agent to the seed in the form of a flowable liquid. The agent can be in a true solution in the liquid, or it can be present as small droplets or particles to form a suspension, dispersion or emulsion. Since many pesticides have low water solubility, it is preferred that when water is the liquid, an aqueous dispersion, suspension, or emulsion of the pesticide be used, and that the pesticide be present in the dispersion, suspension, or emulsion in the form of small particles or droplets. As used herein, the term "suspension" will be considered to include any form of liquid containing small particles, and to include the terms dispersion and emulsion.

The particles of pesticide in the liquid suspension can be of any size that permits the suspension to be applied to the seed by any means, such as, for example, by spraying. It is preferred that the particles of pesticide in the suspension have a number average nominal size of less than about 10 microns, more preferably of less than about 5 microns, even more preferably of less than about 2 microns, and even more preferably of less than about 1 micron (be "sub-micron" in size). It is believed that the use of such small particles causes the pesticide to form a more stable and homogenous suspension—thereby allowing a more even distribution of the pesticide over the surface of the seed, and that the small particles are less subject to abrasion from the treated seed after the pesticide treatment has been applied.

The phytotoxic agent can be applied to the seed in any type of conventional seed treatment or coating equipment. Application in a seed treating machine having the characteristics of a CMS seed coating machine (Vector Corporation, Marion, Iowa), for example, has been found to be suitable. One method that has been found to be successful for applying a phytotoxic agent to seed, is to mill the solid agent to 1-2 micron, or to sub-micron, size and then to add the small particles of the agent to water to form an aqueous suspension. A mill that is capable of reducing solids to fine particles, such as a Mirco-Jet Pulverizer air mill, available from Fluid Energy Processing and Equipment Company, Hatfield, Pa., can be used for the size reduction.

When the phytotoxic agent is a pesticide, the concentration of the pesticide in the suspension should be low enough to permit easy handling and application of the suspension to the coated seed—such as by spraying—and thorough distribution of the pesticide among the coated seeds so that the outer surface of each seed is substantially covered. However, the concentration should be high enough that, when used in combination with the other parameters of seed treatment, to avoid the loss of pesticide from the seeds by dripping or pooling of the treating liquid suspension. Pesticide concentrations of between about 0.1% and about 50%, by weight, are useful for such suspensions, preferred are concentrations between about 0.5% and 15%, by weight, even more preferred are concentrations between about 0.6% and about 5%, and yet more preferred are concentrations of the pesticide between about 1% and 3%, by weight of the suspension. Sticking agents and dyes can also be added to the pesticide suspension to promote the adherence of the suspension to the coated seeds and to identify the seeds as having been treated.

A desired amount of the suspension of the pesticide can be sprayed onto the seed in, for example, a CMS seed treater, over a period of time that is long enough to permit thorough distribution of the suspension over the seed, but short enough so that the treated seed do not completely dry. It is believed that if the treated seed are allowed to remain in a heated seed treater until the suspension is completely dry, the danger of loss of the pesticide by abrasion increases. By way of example, when the exit temperature of the heated air circulating through the CMS machine is held to about 95° F., and the aqueous suspension contains about 1.6% by weight imidacloprid and 8% by weight of a sticking agent, an application time of between about 3 minutes and about 20 minutes is suitable, and an application time of between about 5 and about 15 minutes is preferred.

Seeds that have been treated by the subject method can be stored, handled and planted like any other seeds. Similar methods and conditions can be used as are used with any other treated, or non-treated seeds and the same handling and planting equipment can be used that is used for conventional seeds.

The coated and treated seeds of the present invention can be overcoated with one or more coatings applied after the seeds have been treated with the phytotoxic agent. These later coatings can contain dyes, binders, absorbents, and other useful materials, and can be applied for the purpose of safety, protection, abrasion resistance, or the like.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

General Procedures

Method of Coating Seed with a Polymer:

Seeds were coated with polymers in a CMS Seed Treater model PSC-0.5. In the normal procedure, 750 g of corn seed, or 500 g of sorghum seed, was added to the revolving drum of the CMS Treater. Water soluble polymers that were to be used for the coating were placed into solution in water. Non-water soluble polymers were dispersed into water to form a polymer latex dispersion. Polymer solutions and polymer latexes that are obtained directly from a supplier can also be used with or without further modification. A measured amount of the polymer solution or latex dispersion was sprayed onto the seeds to provide a polymer coating of the thickness that was desired. The polymer coating was dried by hot air blowing through the tumbling seed bed to form a cured polymer coating having a certain pre-determined thickness. All machine settings were according to the manufacturer's recommendations and within normal limits as would be understood by one having skill in the art of seed coating.

Method of Treating Seed with a Pesticide:

Agrochemical agents, normally a pesticide with a herbicide safener, were applied to polymer-coated seeds in a Hege Model 11 seed treater. When a herbicide safener was applied as a part of the seed treatment regimen, Concep III (having 74.3% fluxofenin as its active ingredient; available from Novartis Crop Protection, Inc., Greensboro, N.C.) was used.

Seeds to be treated were placed in the bowl of the Hege 11 machine, the Hege motor was turned on and the premixed Concep III and pesticide were applied into the bed of tumbling seed via syringe. Mixing was allowed to continue for about 40 sec.

Warm Germination Test:

This test was used to determine the maximum germination potential of untreated seeds and seeds that were subjected to treatment.

50 sheets of regular weight, size 12 in×18 in, germination testing towels were soaked overnight in 840 ml of tap water. 50 seeds were placed on a wet sheet using Hoffman Manufacturing germination trays. The sheet with seeds was covered with a second towel and rolled up. Four replicates were run for each sample.

The rolled towels were placed in an upright position in a 1000 ml beaker, which was covered with a polyethylene bag to prevent drying. The container was placed in an alternating temperature germination incubator set for providing cycles of 20° C. for 16 hrs followed by 30° C. for 8 hrs.

Final count of germinated seeds was made after 7 days. Percent germination was determined as the average number of seeds which had germinated within the test period minus any abnormal seeds, divided by the total number of original seeds, times 100.

Cold Germination Test:

This test was designed to measure the ability of seeds to germinate under adverse condition associated with high soil moisture, low soil temperature and microbial activity.

A soil mixture was prepared by thoroughly mixing 6 liters of medium grade sand, 6 liter of sifted peat moss, and 1 liter of water. One-half inch of the soil mixture was placed in the bottom of a tray and leveled. One hundred (100) seeds were placed on top of the soil, and an additional ½ in of soil is placed over the seeds and leveled. Four replicates, each having 100 seeds were run for each sample.

The containers were placed in a cold (10° C.) dark room for 7 days. After 7 days containers were moved to a warm (25° C.) dark room for 3 days. Emerging seedlings were evaluated as either normal or abnormal and counted. Germination rate was determined as described above.

COMPARATIVE EXAMPLE 1

This example illustrates the properties of coatings of several polymers formed on corn seeds.

Coatings of 21 different polymers and one wax emulsion were formed on corn seeds by the method described above. Table 1 lists the different polymers that were tested and describes the chemical makeup of the polymer, the pH of the polymer emulsion, the average particle size of the solids in the emulsion, the glass transition temperature of the polymer ($T_g$), the minimum film-forming temperature of the polymer (MFT), and the type of surfactant (if any) that was provided with the emulsion by the manufacturer. It was noticed that the MFT was roughly related to the $T_g$ for the polymers for which this data was available, but that these values did not always correlate precisely.

Table 2 shows the physical properties of coatings on corn seed that were formed from the polymer emulsions described in Table 1. The moisture content of the seeds after treatment (Water %) was reported, and the quality of the film was analyzed according to three parameters.

The integrity of the coating coverage of the seed was estimated by visual inspection (under magnification if needed). Coverage was rated according to the following scale:

+++++=No visual holes are observed.

++++=There are some small holes on the coating and the size of the holes is about 1 mm or above.

+++=70-95% of the seed surface is covered with the coating.

++=50-70% of the seed surface is covered with the coating.

+=<50% of the seed surface is covered with the coating.

TABLE 1

Physical properties of polymers and polymer emulsions.

| | Name | Type of Materials | pH | Particle Size (um) | Tg (C.) | MFT (C.) | Surfactant Type | Comment |
|---|---|---|---|---|---|---|---|---|
| 1 | Vinamul 18132 | PVA | | | | | | |
| 2 | Vinac XX-210 | PVA | 4.5-6.0 | | 35 | | PVOH | |
| 3 | Polymer 208 | St-Acrylate | | | | | | |
| 4 | Vinamul 6975 | P(VA-Veo) | 4.0-5.0 | 0.5 | 22 | 15 | Cell Ether | |
| 5 | Mowilith DM2452 | P(VA-Veo-Acryl) | 5.0-7.0 | 15 | 18 | 12 | | |
| 6 | Mowilith LDM2110 | P(VA-Veo) | 3.5-5 | 0.1-1.0 | 17 | 8 | | |
| 7 | Mowilith LDM1355 | P(VA-E-Veo) | 3.0-5.0 | 0.5 | −7 | 0 | | |
| 8 | Mowilith DM778 | P(Acryls) | 7.5-8.5 | 12 | 28 | 20 | | |
| 9 | Mowilith LDM2340 | P(VA-Veo) | 5.5-6.5 | 0.19 | 27 | 16 | | |
| 10 | Premafresh 50-V | Carnauba wax emulsion | | | | | | Wax emulsion from Pace International, Ltd. |
| 11 | Airflex 4500 | P(E-VC) | 7.0-9.0 | 0.12 | 3 | 4 | Anionic | Contained Amide Group |
| 12 | Airflex4514 | P(E-VC) | 7.0-9.0 | 0.12 | 12 | 14 | Anionic | Contained Amide Group |
| 13 | Airflex4530 | P(E-VC) | 7.0-9.0 | 0.11 | 29 | 50 | Anionic | Contained Amide Group |
| 14 | Airflex500 | P(VA-E) | 5.0-6.0 | 0.17 | 5 | <0 | Nonionic | |
| 15 | Flexbond289 | St-Acrylate | | | 85 | | | |
| 16 | Flrxbond 381 | P(VA-BA) | 4.0-6.0 | 0.3 | 13 | 6 | Nonionic | |
| 17 | Latex 32 | PVF | 3.0-6.0 | | High | | | |
| 18 | PolycoteC | | | | | | | |
| 19 | CP620NA S/B Latex | S/B | 6.0 | 0.175 | | 15 | | Carboxylation: Low |
| 20 | PB 6820 NA S/A Latex | S/A | 7.0 | 0.16 | 28 | 26 | | Carboxylation: Medium |
| 21 | FC 1040 S/B Latex | S/B | 6.0 | 0.155 | | 15 | | Carboxylation: Medium |
| 22 | CP 6810 NA S/B Latex | S/A | 6.5 | 0.155 | | <4 | | Carboxylation: Medium |

MFT = Minimium Film Forming Temperature (deg. C.),
Particle Size is average particle size,
Ether = Cellulose Ether,
VA = Vinylacetate,
E = Ethylene,
St = Styrene,
VC = Vinylchloride,
BA = Butyl Acrylate,
S/B = Styrene-Butadiene,
S/A = Styrene-Acrylate,
PVA = poly(vinyl acetate).

TABLE 2

Properties of polymer coatings on corn seed.

| | Name | Type of Materials | Manufacture | Adhesion | Coverage | Film | Water % | Tg. (° C.) |
|---|---|---|---|---|---|---|---|---|
| 1 | Vinamul 18132 | PVA | Vinamual LTd. | ++++ | ++++ | +++++ | | |
| 2 | Vinac XX-210 | PVA | Air-Product | +++ | ++ | +++++ | | 35 |
| 3 | Polymer 208 | St-Acrylate | Kannar | +++++ | +++++ | ++++ | 12.35 | |
| 4 | Vinamul 6975 | P(VA-Veo) | Vinamual LTd. | ++++ | +++++ | ++++ | 13.01 | 22 |
| 5 | Mowilith DM2452 | P(VA-Veo-Acryl) | Clariant | +++ | +++ | +++ | 12.76 | 18 |
| 6 | Mowilith LDM2110 | P(VA-Veo) | Clariant | +++ | ++++ | +++ | 13.25 | 17 |
| 7 | Mowilith LDM1355 | P(VA-E-Veo) | Clariant | +++++ | +++ | +++++ | 12.66 | −7 |
| 8 | Mowilith DM778 | P(Acryls) | Clariant | +++ | +++++ | ++++ | 13.23 | 28 |
| 9 | Mowilith LDM2340 | P(VA-Veo) | Clariant | +++++ | ++++ | +++ | 12.69 | 27 |
| 10 | Premafresh 50-V | Carnauba | Pace International | +++ | +++ | + | 13.41 | |
| 11 | Airflex 4500 | P(E-VC) | Air-Product | +++++ | ++ | ++++ | 13.27 | 3 |
| 12 | Airflex4514 | P(E-VC) | Air-Product | +++++ | +++++ | ++++ | 12.43 | 12 |
| 13 | Airflex4530 | P(E-VC) | Air-Product | ++ | ++ | + | 12.57 | 29 |
| 14 | Airflex500 | P(VA-E) | Air-Product | +++++ | ++++ | +++++ | 12.79 | 5 |
| 15 | Flexbond289 | St-Acrylate | Air-Product | +++ | +++ | ++ | 11.48 | 85 |
| 16 | Flrxbond 381 | P(VA-BA) | Air-Product | ++++ | +++++ | ++++ | 13.35 | 13 |
| 17 | Latex 32 | PVF | Kynar | ++ | +++ | + | 12.52 | High |
| 18 | PolycoteC | | Subsahara | +++ | ++++ | +++ | 13.04 | |
| 19 | CP620NA S/B Latex | S/B | Dow | +++++ | +++++ | ++++ | 12.68 | |

TABLE 2-continued

Properties of polymer coatings on corn seed.

| Name | Type of Materials | Manufacture | Adhesion | Coverage | Film | Water % | Tg. (° C.) |
|---|---|---|---|---|---|---|---|
| 20 PB 6820 NA S/A Latex | S/A | Dow | ++++ | +++++ | ++++ | 12.6 | 28 |
| 21 FC 1040 S/B Latex | S/B | Dow | +++ | +++++ | ++++ | 13.89 | |
| 22 CP 6810 NA S/B Latex | S/A | Dow | +++++ | +++++ | ++++ | 13.63 | |

The adhesion of the coating to the seed was tested by adhering a piece of Scotch® brand adhesive tape to a part of a seed that was covered by a coating, and then peeling off the tape and determining how much of the coating was removed from the seed. The degree of adhesion was described according to the following scale:

+++++=No coating comes off.
++++=10-20% of the coating from taped area comes off.
+++=30-50% of the coating from taped area comes off.
++=>50% of the coating from taped area comes off.

The quality of the film (Film) was evaluated by the appearance of the coating on the surface of the seed according to visual inspection (under magnification as needed). The quality was expressed according to the following scale:

+++++=Coherent film having no unfused polymer particles.
++++=Less than 5% of unfused polymer particles.
+++=Unfused polymer particles (20-5%)+film (80-95%) for the coating covered area.
++=Unfused polymer particles(50-80%)+film (50-20%) for the coating covered area.
+=Unfused polymer particles on the surface of the seed.

In general, coatings that were formed from Polymer 208, Vinamul 6975, Mowilith LDM2110, Mowilith DM778, Premafresh 50-V, Airflex 4514, Flexbond 381, CP620NA S/B Latex, PB 6820 NA S/A Latex, FC 1040 S/B Latex, and CP 6810 NA S/B Latex provided coating properties that were superior to the other polymers tested.

EXAMPLE 1

This example illustrates the coating of sorghum seeds with polyvinylacetate followed by treatment with different levels of imidacloprid and fluxofenin safener.

Sorghum seeds were coated with 10 micron and 50 micron thick coatings of polyvinylacetate (Vinac XX-210; available from Air Products as a 55% d.s. emulsion in water), and then treated with three different rates of fluxofenin (Concep III; available from Novartis Crop Protection, Inc.) and imidacloprid (available as Gaucho 600; containing 48.7% imidacloprid; from Gustafson LLC, Piano, Tex). Concep III/Gaucho rates used were 50/250 gram, 100/500 gram, and 150/750 grams per 100 kg. of seeds. The germination rate of the seeds was tested by cold germination and warm germination tests on the day that the treatment was administered (T0), and the seeds were then stored at a temperature of 35° C. to simulate accelerated aging. In the warm germination test, treated seeds and untreated controls were again tested for germination rate after 8 days, (T8), 14 days (T14), 33 days (T33), 120 days (T120), and 161 days (T161). Germination rates obtained from the warm germination test are shown in FIG. 1. Germination rates for the cold germination test were determined at approximately the same time intervals and are shown in FIG. 2.

Figure 2:
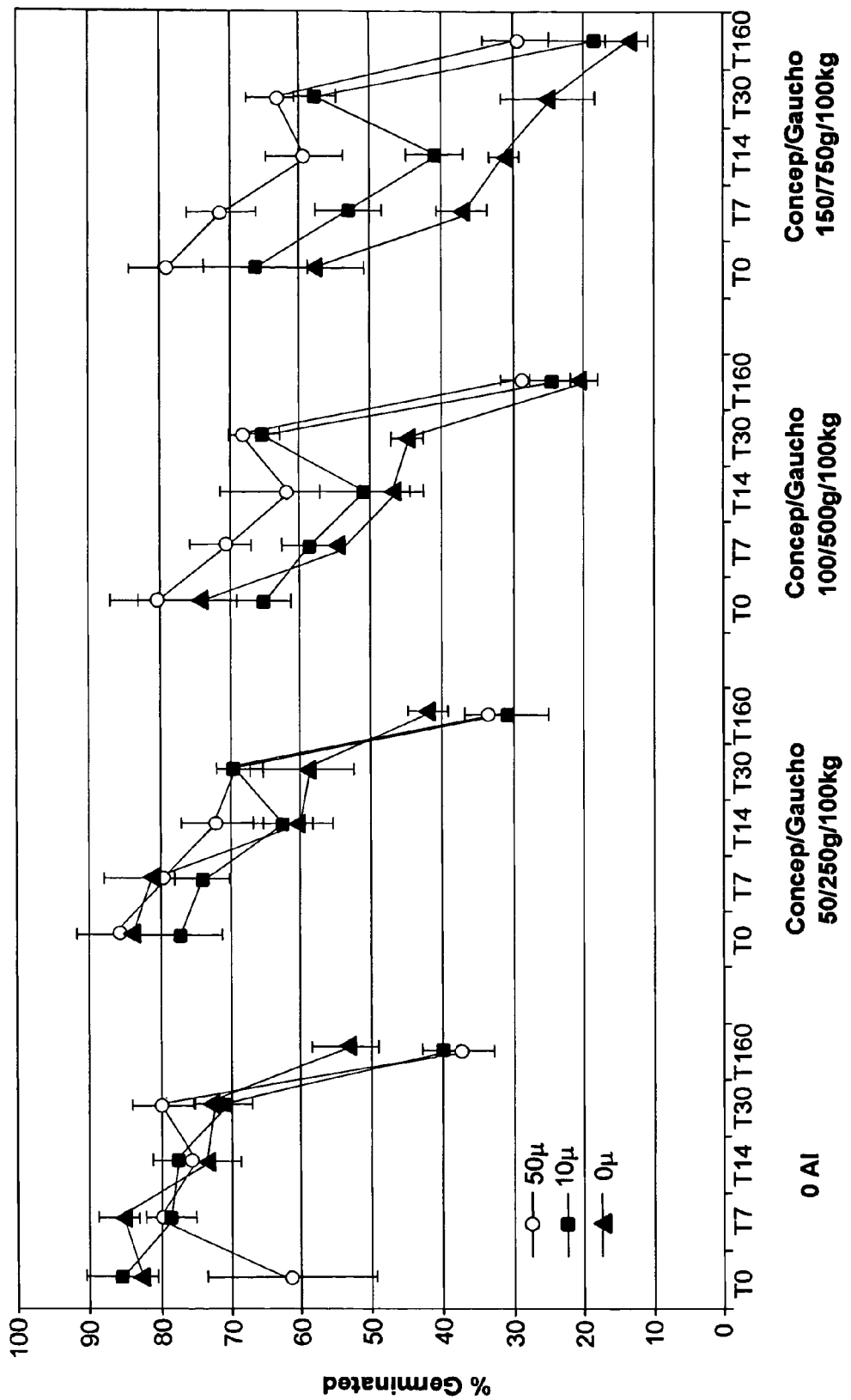
FIG. 2 is a graph showing the germination rate of sorghum seeds in a cold germination test as a function of days after treatment, for seeds having no coating and having 10μ and 50μ coatings of Vinac XX-210 polymer followed by treatment with a ConcepIII safener and with imidacloprid at levels of 0, 250 g, 500 g, and 750 g per 100 kg of seeds.

FIGS. 1 and 2 show the effects of time-after-treatment, pesticide treatment rate, and coating thickness on germination in warm and cold germination tests, respectively. It was seen that the presence of pesticide on the seed reduced the germination rate in both warm and cold germ tests, and that, without a polymer coating, the reduction in germination rate was more pronounced for cold germination. For both warm and cold germination, it was found that increasing pesticide rates markedly reduced the germination rate. Seeds having either a 10μ or a 50μ polymer coating prior to pesticide treatment had improved germination rates compared to seeds without any polymer coating. Also, the germination rate was increased as the coating thickness was increased from 10μ to 50μ.

In the warm germination test, at the highest level of pesticide treatment, after 14 days of aging at 35° C., seeds having 50μ coatings had a germination rate of 70% vs. 40% for uncoated seeds with the same rate of pesticide treatment. In the cold germination test for similar seeds and similar conditions, coated seeds showed germination rates of 60% vs. 30% for uncoated seeds.

EXAMPLE 2

This example illustrates the effect of the properties of the polymer coating upon seed germination rate.

Figure 3:
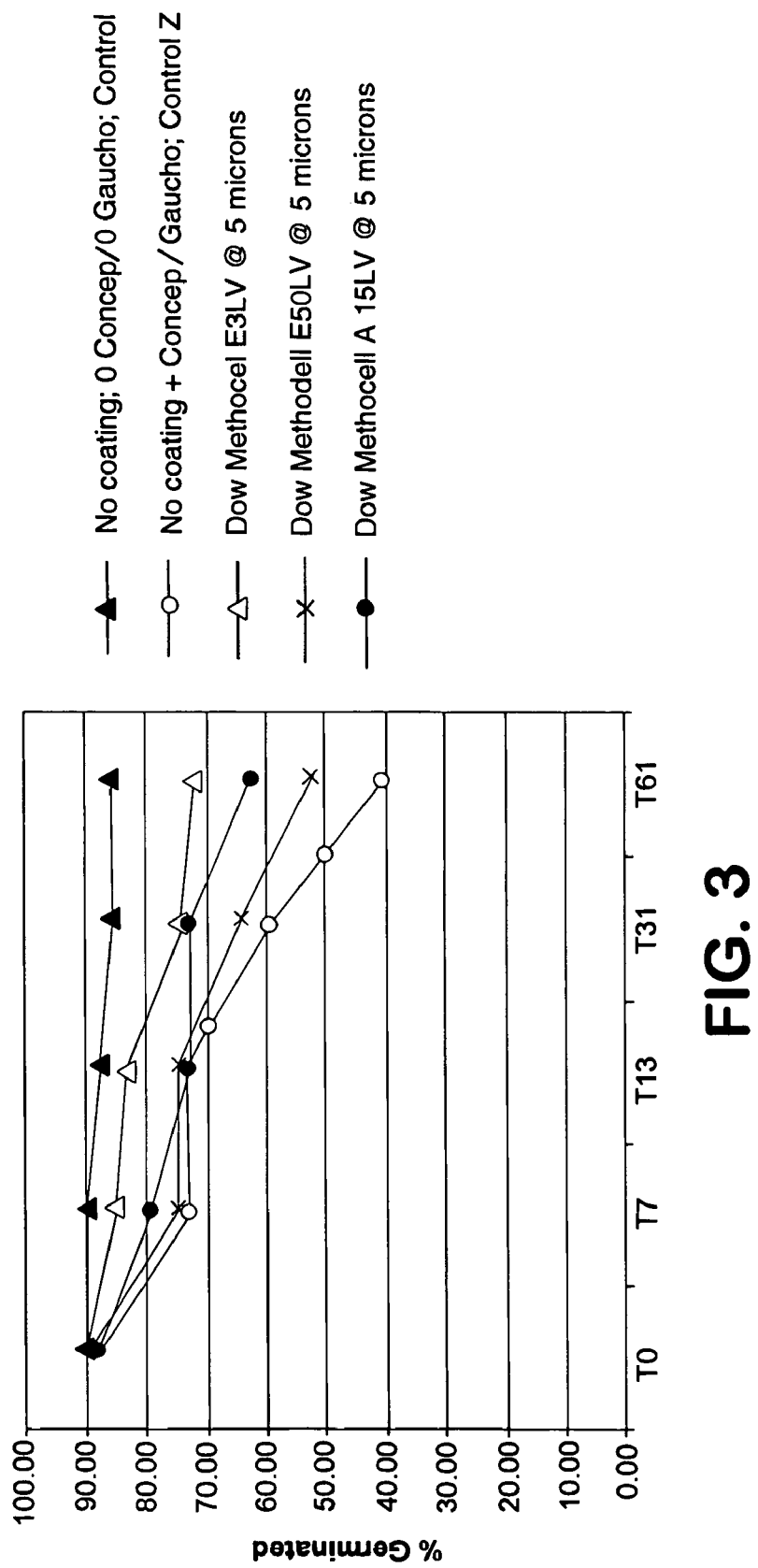
FIG. 3 is a graph showing the germination rate of sorghum seeds in a warm germination test as a function of days after treatment, for seeds having no coating and having 5μ coatings of three different Methocel polymers, where the coatings were followed by treatment with a ConcepIII safener and with imidacloprid at levels of 0 and 250 g/100 kg of seeds.
Figure 4:
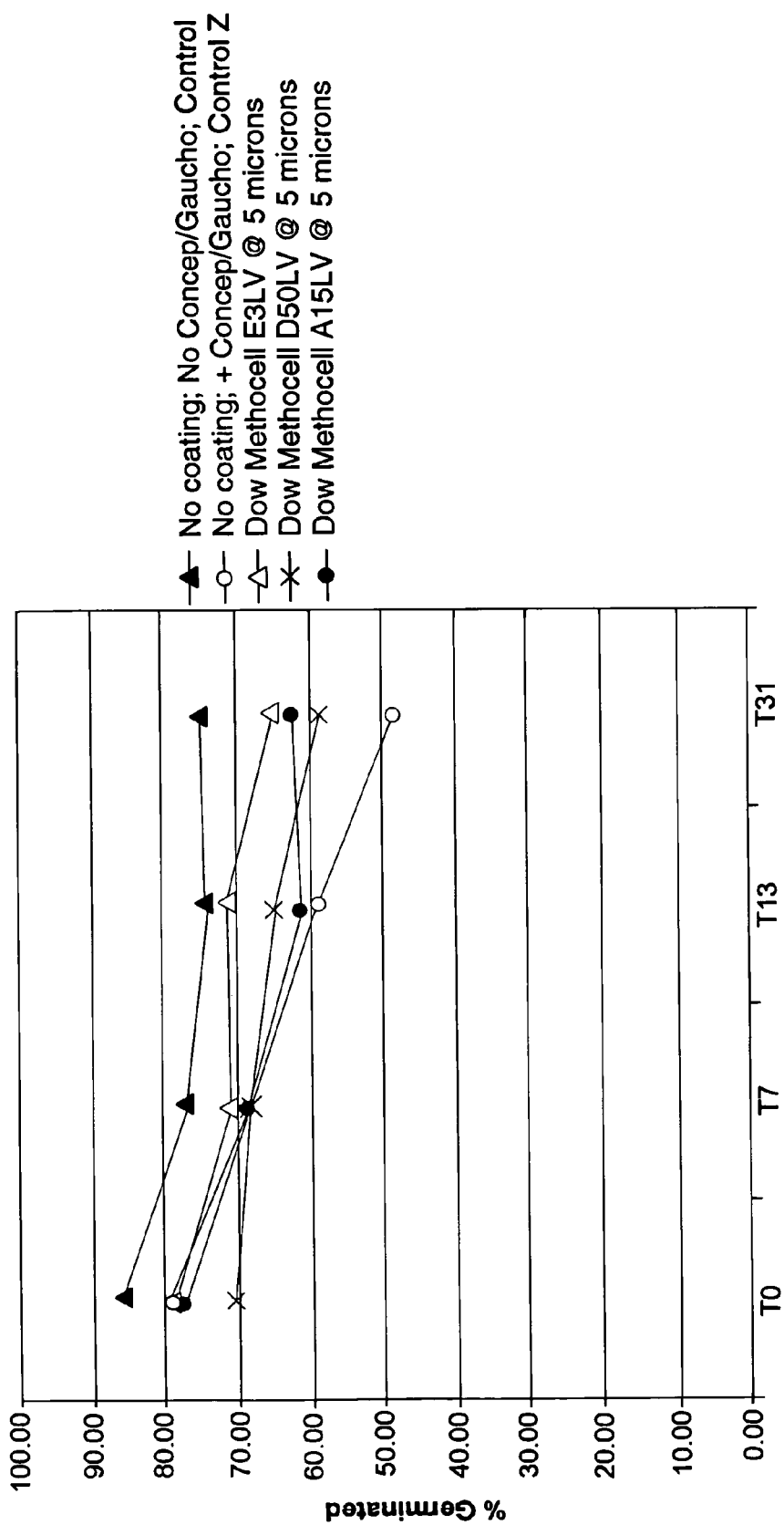
FIG. 4 is a graph showing the germination rate of sorghum seeds in a cold germination test as a function of days after treatment, for seeds having no coating and having 5μ coatings of three different Methocel polymers, where the coatings were followed by treatment with a ConcepIII safener and with imidacloprid at levels of 0 and 250 g/100 kg of seeds.

Sorghum seeds were first coated as described above with a 5 micron thick coating of different blends of hydroxypropyl cellulose and methyl cellulose, which contained different ratios of hydroxypropyl and methyl groups. The polymers used were Methocel E50LV (a 2% w/w solution in water having a viscosity of 40-60 mPa at 25° C.), Methocel E3LV (a 2% w/w solution in water having a viscosity of 2.4-3.6 mPa at 25° C.), and Methocel A15LV (a 2% w/w solution in water having a viscosity of 12-18 mPa at 25° C.) (all available from Dow Chemical Co., Midland, Mich., and used as 5% d.s. emulsions in water). Coated seeds were treated with Concep III/Gaucho at rate of 50/250 grams per 100 kg of seed. After treatment, untreated and treated seeds were tested for warm germination and cold germination on the same day as the treatment (T0), and again after accelerated aging at 35° C. for 7 days, (T7), 14 days (T14) and 33 days (T33). The resulting data are shown in FIG. 3 for the warm germination test, and in FIG. 4 for the cold germination test.

The data for both warm and cold germination tests show that the presence of the pesticide on uncoated seeds reduces the germination rate significantly compared with seeds having no pesticide treatment. At 31 days, for example, the addition of the pesticide causes the warm germination rate to drop from about 86% to about 60%, and the cold germination rate to drop from about 75% to about 49%. The addition of any of the three polymer coatings provided significant protection to the seeds. The coating comprising Methocel E3 LV performed best, while the coating comprising Methocel A15LV performed next best, and the coating comprising Methocel E50LV performed least well of the three, but still provided significant protection over pesticide treated seeds having no polymer coating. This order of performance was the same for both the warm germination and the cold germination tests.

Without being bound by this or any other theory, it is believed that the viscosity of the water solutions of these polymers had an effect on the integrity of the films that were produced on the seeds. It appeared that coating solutions having lower viscosities provided coatings that performed better than coating solutions that had higher viscosities.

EXAMPLE 3

This example illustrates the effect of the type of polymer used for the coating and the rate of pesticide application upon seed germination rate.

Figure 5:
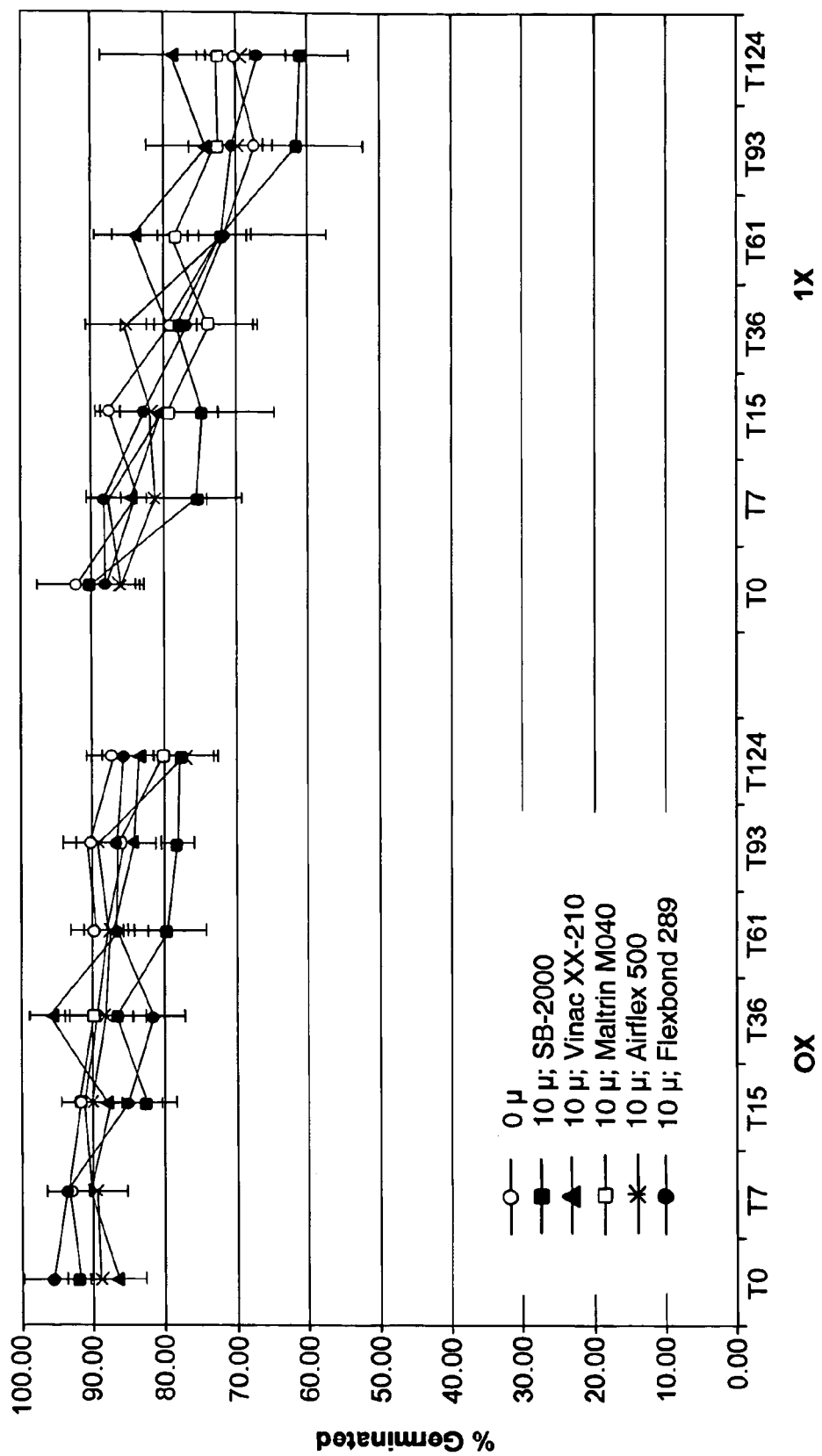
FIG. 5 is a graph showing the germination rate of sorghum seeds in a warm germination test as a function of days after treatment, for seeds having no coating and having 10μ coatings of either SB-2000 polymer, Vinac XX-210, Maltrin MO40, Airflex 500, or Flexbond 289, polymers, where the coatings were followed by treatment with a ConcepIII safener and with imidacloprid at levels of 0 and 250 g/100 kg of seeds.

Sorghum seeds (DK40Y 1752 KXM, from DeKalb Genetics) were coated as described above with a 10 micron thick coating of one of five different polymers. Control seeds were prepared without any polymer coating. The polymers used were SB-2000 (a proprietary, starch-based polymer available from Seedbiotics, Inc., Caldwell, Idaho), Vinac XX-210 (polyvinlyacetate in polyvinylalcohol-protected emulsion, available from Air Products and Chemicals, Inc., Allentown, Pa.), Maltrin MO40 (maltodextrin, available from GPC, Inc., Muscatine, Iowa), Airflex 500 (polyvinylacetate/ethylene copolymer, available from Air Products and Chemicals, Inc., Allentown, Pa.), and Flexbond 289 (vinylacrylate polymer, available from Air Products and Chemicals, Inc., Allentown, Pa.). All polymers were used as water emulsions. Coated seeds were either left untreated (0× treatment), or were treated with Concep III/Gaucho at rate of 50/250 grams per 100 kg of seed (1× treatment). After treatment, untreated and treated seeds were tested for warm germination rate on the same day as the treatment (T0), and again after accelerated aging at 35° C. for 7 days, (T7), 15 days (T15), 36 days (T36), 61 days (T61), 93 days (T93, and 124 days (T124). The resulting data are shown in FIG. 5.

The data for the warm germination rate test showed that the presence of any of the polymer coatings reduced the germination rate for seeds having no pesticide treatment. The reduction was either negligible (less than about 5% below the germination rate for no coating at 124 days; Flexbond 289, Vinac XX-210), moderate (less than about 8% reduction; Maltrin MO40), or higher (less than about 10% reduction, SB-2000, Airflex 500). When seeds were treated with Concep III/Gaucho at rate of 50/250 grams per 100 kg of seed, the warm germination rate of uncoated seed was reduced from about 87% at 124 days (for non-pesticide treated seed) to just under 70%. Seeds coated with 10μ coatings of Vinac XX-210 (having an MTF of about 35° C.) and Maltrin MO40 had higher germination rates than uncoated seed, indicating that the polymer coating provided protection for the seed. Seeds coated with Airflex 500 (MFT of<0° C.) or Flexbond 289 performed at about the same germination level as uncoated seeds. Germination rate of seeds coated with 10μ coatings of SB-2000 (having an MFT of about 50° C.) was almost 10% lower than uncoated seeds.

This data indicated that different types of polymers differed in their ability to protect seeds from phytotoxicity of overcoated pesticides when applied to the untreated seed as 10 coatings.

EXAMPLE 4

This illustrates the effect the thickness and the type of polymer used for seed coating on the warm germination rate of seeds to be treated with a pesticide.

Figure 6:
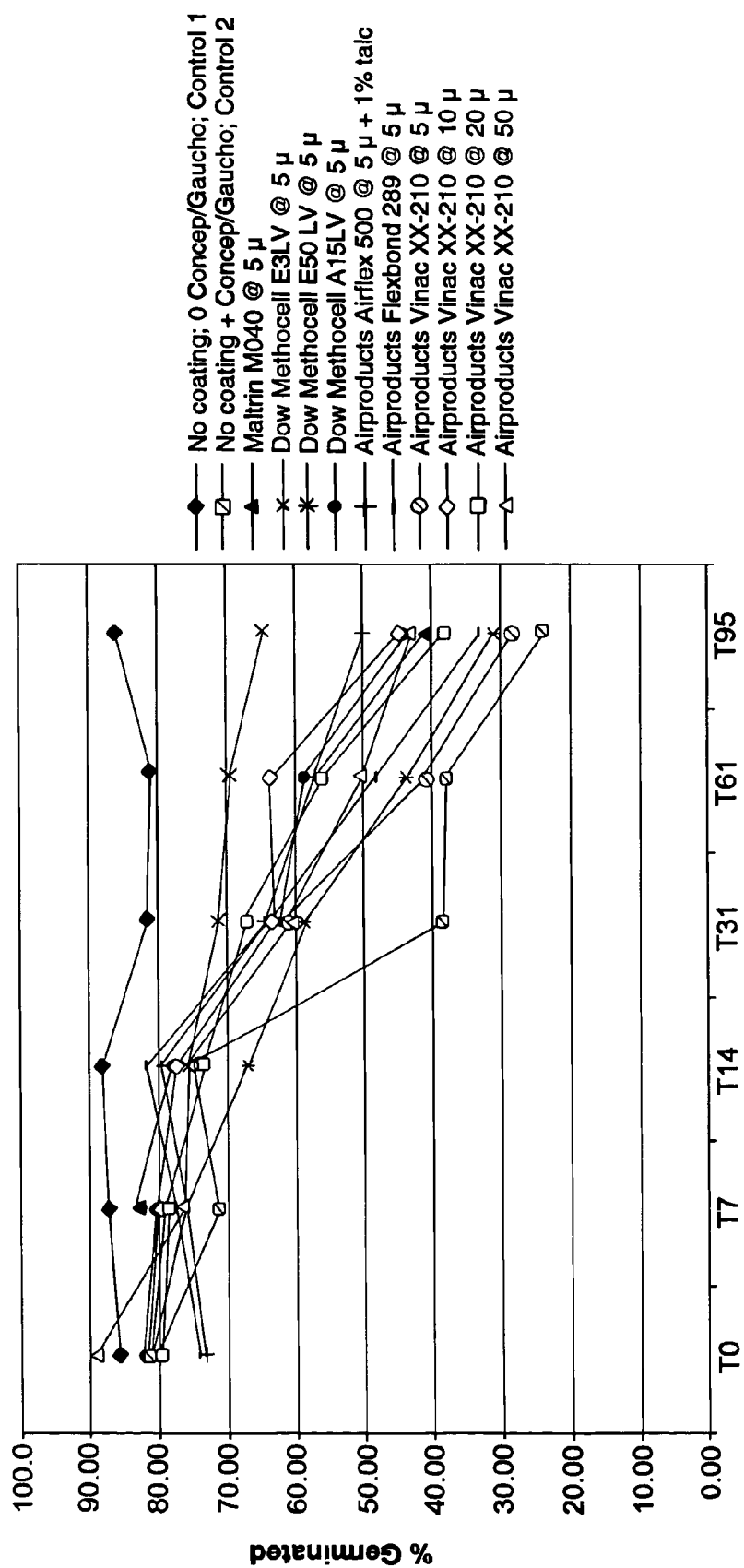
FIG. 6 is a graph showing the germination rate of sorghum seeds in a warm germination test as a function of days after treatment, for seeds having no coating and having 5μ coatings of Maltrin MO40, Methocel E3LV, Methocel E50LV, Methocel A15LV, Airflex 500+1% talc, Flexbond 289, and 5μ, 10μ, 20μ and 50μ coatings of Vinac XX-210, where the coatings were followed by treatment with a ConcepIII safener and with imidacloprid at levels of 0 and 250 g/100 kg of seeds.

Sorghum seeds (DeKalb DK40Y 1752KXM) were coated as described above with 5μ coatings of one of seven different polymers. One of the polymers was used to form three additional coatings of increasing thicknesses—10μ, 20μ, and 50μ). Control seeds were prepared without any polymer coating (control 1). The polymers used (and the coating thickness) were Maltrin MO40 (5μ), Methocel E3LV (5μ), Methocel E50LV (5μ), Methocel A15LV (5μ), Airflex 500 (5μ+1% talc), Flexbond 289 (5μ), and Vinac XX-210 (at 5μ, 10μ, 20μ, and 50μ). All polymers were used as water emulsions. Coated seeds were either left untreated (control 2), or were treated with Concep III/Gaucho 600 at the rate of 50/250 grams per 100 kg of seed. After treatment, untreated and treated seeds were tested for warm germination rate on the same day as the treatment (T0), and again after accelerated aging at 35° C. for 7 days, (T7), 14 days (T14), 31 days (T31), 61 days (T61), and 95 days (T95). The resulting data are shown in FIG. 6.

The data for the germination rate test showed that after 95 days of aging, the germination rate of uncoated seeds that were treated with pesticide had dropped to almost 24%, vs. about 85% for uncoated and untreated seeds. All coated/treated seeds having 5μ polymer coatings had higher germination rates at 95 days than uncoated/treated seeds. In order of improving germination rate at 95 days were coated/treated seeds having coatings of Vinac XX-210 (28% germination), Methocel E50LV (31%), Flexbond 289 (33%), Maltrin MO40 (41%), Methocel A15LV (44%), Airflex 500+1% talc (50%), and Methocel E3LV (64.5%). These data illustrated that different types of polymers provided different levels of protections when used at the same coating thickness. In general, it appeared that polymers that provided a coating solution or latex having low viscosity and having a low MFT gave better protection that did polymers having a high solution or latex viscosity and a high MFT.

For seeds that had been treated with different coating thicknesses of Vinac XX-210, germination rates were 28.5% for 5μ, 44.5% for 10μ, 38% for 20μ, and 43% for 50μ. This showed that the beneficial effects of coating thickness did not simply increase with increasing coating thickness, but seemed to reach a peak or maximum where further coating thickness did not result in further improvement of protection.

EXAMPLE 5

This illustrates the effect the thickness and the type of polymer used for seed coating on the cold germination rate of seeds to be treated with a pesticide.

Figure 7:
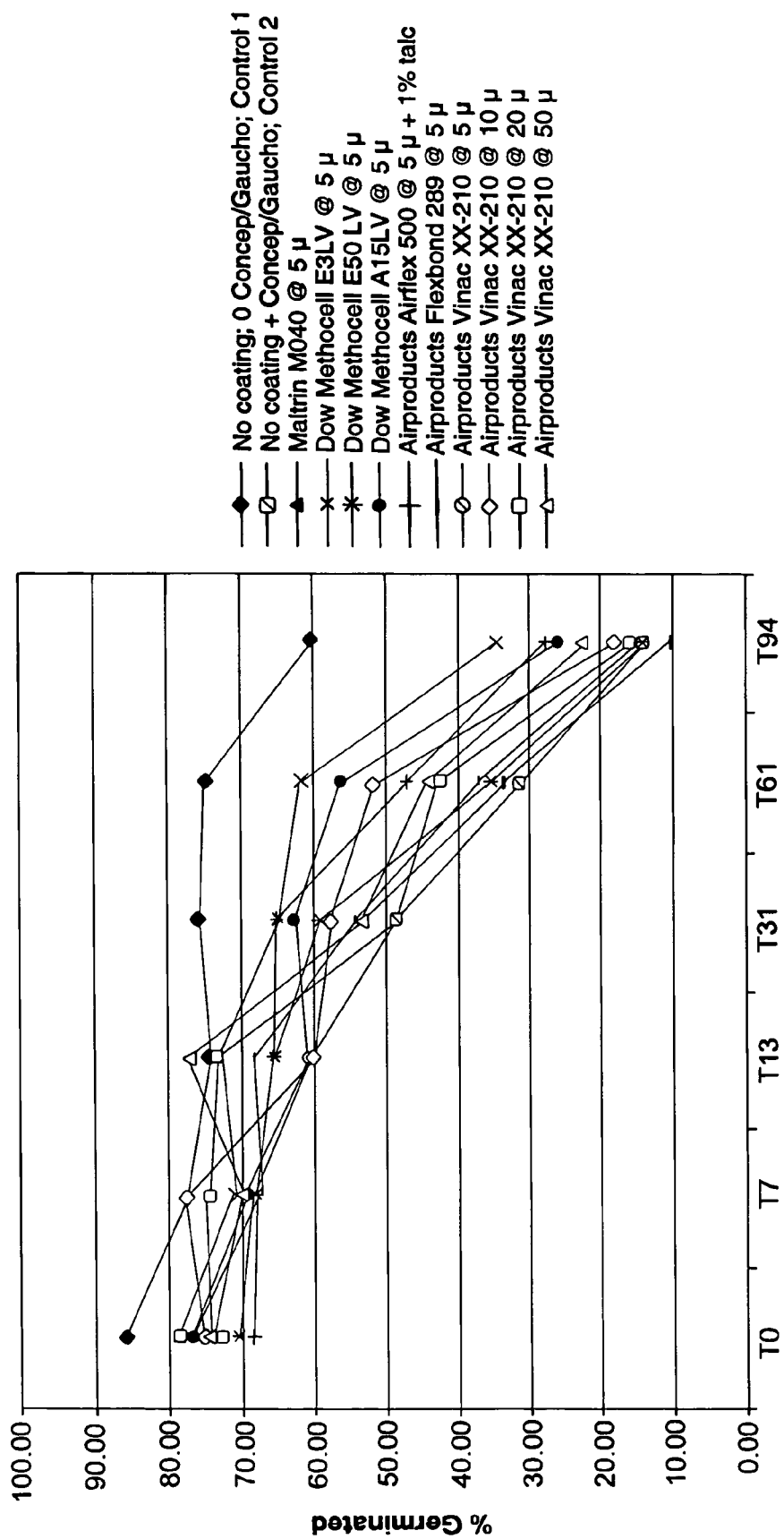
FIG. 7 is a graph showing the germination rate of sorghum seeds in a cold germination test as a function of days after treatment, for seeds having no coating and having 5μ coatings of Maltrin MO40, Methocel E3LV, Methocel E50LV, Methocel A15LV, Airflex 500+1% talc, Flexbond 289, and 5μ, 10μ, 20μ, and 50μ coatings of Vinac XX-210, where the coatings were followed by treatment with a ConcepIII safener and with imidacloprid at levels of 0 and 250 g/100 kg of seeds.

This test substantially duplicated Example 4, except that a cold germination test was run on the treated seeds to determine the effects of the coatings under adverse germination/sprouting conditions. The resulting data are shown in FIG. 7.

Compared with warm germination, the cold germination test resulted in lower overall germination rates at the end of the test (94 days). Germination rate for uncoated/untreated control was about 60% vs. 14% for uncoated/treated seeds. All coatings, except one, provided protection for the seed and resulted in higher germination rates. In order of improved germination rates, the performance was: Vinac XX-210 (10% germination), Methocel E50LV (14%), Flexbond 289 (15%), Maltrin MO40 (23.5%), Methocel A15LV (26%), and Methocel E3LV (34.5%). This was the same ranking as found in the warm germination test, and indicated that polymer properties that determined suitability for the present use did not vary disproportionately, as between the polymers tested, over the temperature range spanned by the warm and cold germination tests. In other words, polymers that work well at warm temperatures also seem to work well at cold temperatures.

For seeds that had been treated with different coating thicknesses of Vinac XX-210, germination rates were 10% for 5μ, 18% for 10μ, 16% for 20μ, and 22.5% for 50μ. As in Example 4, this showed that the beneficial effects of coating thickness did not simply increase with increasing coating thickness, but seemed to reach a plateau where further coating thickness did not result in significant further improvement of protection.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A method of improving the germination rate of plant seeds which are treated with a phytotoxic agent, the method comprising:

forming a polymer coating on the plant seed before treating the seed with the phytotoxic agent, wherein the coating comprises the polymer in an amount of at least about 50% by weight and where the polymer is selected from the group consisting of maltodextrin, methylcellulose, ethylcellulose, hydroxypropylcellulose, hydroxypropyl/methylcellulose, vinyl acetate - ethylene polymers, ethylene-vinyl chloride polymers, vinyl acetate polymers, vinyl-acrylic polymers, starch-based polymers, SB-2000, polyvinyl acetate -vinyl chloride polymers, vinyl chloride/ vinyl acetate/ ethylene copolymers, styrene-acrylate copolymers, vinylacetate polymers, vinylbutyrate polymers, styrene-vinylbutyrate copolymers, acrylate polymers, styrene-butadiene copolymers, vinylacetate-vinylbutyrate copolymers, and vinylacetate-vinylversatate copolymers, and where the coating is free of the phytotoxic agent and is a uniform coating having a thickness of from 1 to 500 microns and having between 0% and 20% unfused particles of the polymer in the coating; and treating the coated plant seed with the phytotoxic agent.

2. The method according to claim 1, wherein the treatment comprises the steps:

a. providing a seed;

b. contacting the seed with a latex comprising a polymer that is selected from the group consisting of maltodextrin, methylcellulose, ethylcellulose, hydroxypropylcellulose, hydroxypropyl/methylcellulose, vinyl acetate - ethylene polymers, ethylene-vinyl chloride polymers, vinyl acetate polymers, vinyl-acrylic polymers, starch-based polymers, SB-2000, polyvinyl acetate -vinyl chloride polymers, vinyl chloride/ vinyl acetate/ ethylene copolymers, styrene-acrylate copolymers, vinylacetate polymers, vinylbutyrate polymers, styrene-vinylbutyrate copolymers, acrylate polymers, styrene-butadiene copolymers, vinylacetate-vinylbutyrate copolymers, and vinylacetate-vinylversatate copolymers;

c. forming a polymer coating on the plant seed before treating the seed with the phytotoxic agent, wherein the coating comprises the polymer in an amount of at least about 50% by weight and where the coating is free of the phytotoxic agent and is a uniform coating having a thickness of from 1 to 500 microns and having between 0% and 20% unfused particles of the polymer in the coating; and d. contacting the polymer coated seed with the phytotoxic agent.

3. The method according to claim 2, wherein the polymer coating is applied so that it directly contacts the seed without intervening material between the coating and the seed.

4. The method according to claim 1, wherein the coating thickness is between about 1 micron and about 480 microns.

5. The method of claim 1, wherein the polymer is one having a minimum film-forming temperature of lower than 55° C.

6. The method of claim 5, wherein the polymer is polyvinylacetate.

7. The method of claim 5, wherein the polymer is methocel.

8. The method of claim 1, wherein the seed is the seed of an agronomic plant which selected from the group consisting of cereals, wheat, barley, rye, oats, rice, sorghum, related crops, beet, pear-like fruits, stone fruits, soft fruits, apple, pear, plum, peach, Japanese apricot, prune, almond, cherry, strawberry, raspberry, black berry, tomato, pepper, legumes, kidney bean, lentil, pea, soybean, oil plants, rape, canola, mustard, poppy, olive, sunflower, coconut, castor, cocoa bean, peanut, soybean, corn, Cucurbitaceae, pumpkin, cucumber, melon, citrus, orange, lemon, grape fruit, mandarin, Watson pomelo (citrus natsudaidai), vegetables, lettuce, cabbage, celery cabbage, Chinese radish, carrot, onion, potato, camphor trees, avocado, cinnamon, camphor, corn, tobacco, nuts, coffee, sugar cane, tea, grapevine, hop and banana.

9. The method of claim 8, wherein the agronomic plant is selected from the group consisting of rice, wheat, barley, rye, corn, potato, carrot, sweet potato, sugar beet, bean, pea, chicory, lettuce, cabbage, cauliflower, broccoli, turnip, radish, spinach, asparagus, onion, garlic, eggplant, pepper, celery, canot, squash, pumpkin, zucchini, cucumber, apple, pear, quince, melon, plum, cherry, peach, nectarine, apricot, strawberry, grape, raspberry, blackberry, pineapple, avocado, papaya, mango, banana, soybean, tomato, sorghum and raspberries, banana and other such edible varieties.

10. The method of claim 9, wherein the agronomic plant is selected from corn, soybeans, cotton, sorghum, rape (canola), rice, wheat, barley, and rye.

11. The method of claim 9, wherein the agronomic plant is corn, soybeans, or cotton.

12. The method of claim 1, wherein the phytotoxic agent is selected from the group consisting of pesticides, fertilizers, plant growth regulators, drugs, dyes, biological attractants, scents, pheromones, and mixtures thereof.

13. The method of claim 1, wherein the phytotoxic agent comprises a pesticide selected from the group consisting of herbicides, molluscicides, insecticides, nematocides, acaricides, fungicides, bactericides, and mixtures thereof.

14. The method of claim 13, wherein the pesticide comprises an insecticide.

15. The method of claim 14, wherein the insecticide comprises a pyrethroid or synthetic pyrethrin.

16. The method of claim 15, wherein the pyrethrin comprises a member selected from the group consisting of 2-allyl-4-hydroxy-3-methyl-2-cyclopenten-1-one ester of 2,2-dimethyl-3-(2-methylpropenyl)-cyclopropane carboxylic acid, (2-methyl-1-propenyl)-2-methoxy-4-oxo-3-(2-propenyl)-2-cyclopenten-1-yl ester and mixtures of cis and trans isomers thereof.

17. The method of claim 15, wherein the pyrethroid comprises a member selected from the group consisting of (s)-cyano(3-phenoxyphenyl)methyl-4-chloro alpha (1-methylethyl)benzeneacetate (fenvalerate, CAS RN 51630-58-1), (S)-cyano-(3-phenoxyphenyl)methyl (S)-4-chloro-alpha-(1-methylethyl)benzeneacetate (esfenvalerate, CAS RN 66230-04-4), (3-phenoxyphenyl)-methyl(+)cis-trans-3-(2,2-dichoroethenyl)-2,2-dimethylcyclopropanecarboxylate (permethrin, CAS RN 52645-53-1), (±) alpha-cyano-(3-phenoxyphenyl)methyl(+)-cis,trans-3-(2,2-dichloroethenyl)-2,2-dimethyl-cyclopropane carboxylate (cypermethrin, CAS RN 52315-07-8), (beta-cypermethrin, CAS RN 65731-84-2), (theta cypermethrin, CAS RN 71697-59-1), S-cyano (3-phenoxyphenyl)methyl (±) cis, trans 3-(2,2-dichloroethenyl) 2,2 dimethylcyclopropane carboxylate (zeta-cypermethrin, CAS RN 52315-07-8), (s)-alpha-cyano-3-phenoxybenzyl (1R, 3R)-3-(2,2-dibromovinyl)-2,2-dimethylcyclopropanecarboxylate (deltamethrin, CAS RN 52918-63-5), alpha-cyano-3-phenoxybenzyl 2,2,3,3,-tetramethyl cyclopropoanecarboxylate (fenpropathrin, CAS RN 64257-84-7), (RS)-alpha-cyano-3-phenoxybenzyl(R)-2-[2-chloro-4-(trifluoromethyl) anilino]-3-methylbutanoate (tau-fluvalinate, CAS RN 102851-06-9), (2,3,5,6-tetrafluoro-4-methylphenyl)methyl-(1-alpha, 3-alpha)-(Z)-(±)-3-(2-chloro-3,3,3-trifluoro-1-propenyl)-2,2-dimethylcyclopropanecarboxylate (tefluthrin, CAS RN 79538-32-2), (±)-cyano (3-phenoxyphenyl)methyl (±)-4-(difluoromethoxy)-alpha-(1-methyl ethyl)benzeneacetate (flucythrinate, CAS RN 70124-77-5), cyano(4-fluoro-3-phenoxyphenyl)methyl 3[2-chloro-2-(4-chlorophenyl) ethenyl]-2,2-dimethylcyclopropanecarboxylate (flumethrin, CAS RN 69770-45-2), cyano(4-fluoro-3-phenoxyphenyl) methyl 3-(2,2-dichloroethenyl)-2,2-dimethyl-cyclopropanedarboxylate (cyfluthrin, CAS RN 68359-37-5), (beta cyfluthrin, CAS RN 68359-37-5), (transfluthrin, CAS RN 118712-89-3), (S)-alpha-cyano-3-phenoxybenzyl(Z)-(1R-cis)-2,2-dimethyl-3-[2-(2,2,2-trifluoro-trifluoromethyl-ethoxycarbonyl)vinyl]icyclopropane carboxylate (acrinathrin, CAS RN 101007-06-1), (1R cis) S and (1S cis) R enantiomer isomer pair of alpha-cyano-3-phenoxybenzyl-3-(2,2-dichlorovinyl)-2,2-dimethylcyclopropane carboxylate (alpha-cypermethrin, CAS RN 67375-30-8), [1R,3S)3(1RS) (1,2',2',2'-tetrabromoethyl)]-2,2-dimethylcyclopropanecarboxylic acid (s)-alpha-cyano-3-phenoxybenzyl ester (tralomethrin, CAS RN 66841-25-6), cyano-(3-phenoxyphenyl) methyl 2,2-dichloro-1-(4-ethoxyphenyl)cyclopropane carboxylate (cycloprothrin, CAS RN 63935-38-6), [1α, 3α(Z)]-(±)-cyano-(3-phenoxyphenyl)methyl 3-(2-chloro-3,3,3-trifluoro-1-propenyl)-2,2-dimethylcyclopropanecarboxylate (cyhalothrin, CAS RN 68085-85-8), [1-alpha (s), 3-alpha(z)]-cyano(3-phenoxyphenyl)methyl-3-(2-chloro-3, 3,3-trifluoro-1-propenyl)-2,2-dimethylcyclopropanecarboxylate (lambda cyhalothrin, CAS RN 91465-08-6), (2-methyl-[1,1-biphenyl]-3-yl)methyl-3-(2-chloro -3,3,3-trifluoro-1-propenyl)-2,2-dimethyl-cyclopropanecarboxylate (bifenthrin, CAS RN 82657-04-3), 5-1-benzyl-3-furylmethyl-d-cis(1 R, 3S,E) 2,2-dimethyl-3-(2-oxo,-2,2,4,5 tetrahydro thiophenylidenemethyl)cyclopropanecarboxylate (kadethrin, RU15525, CAS RN 58769-20-3), [5-(phenylmethyl)-3-furanyl]-3-furanyl-2,2-dimethyl-3-(2-methyl-1-propenyl)cyclopropane carboxylate (resmethrin, CAS RN 10453-86-8), (1R-trans)-[5-(phenylmethyl)-3-furanyl]methyl 2,2-dimethyl-3-(2-methyl-1-propenyl)cyclopropanecarboxylate (bioresmethrin, CAS RN 28434-01-7), 3,4,5,6-tetrahydro-phthalimidomethyl-(1 RS)-cis-trans-chrysanthemate (tetramethrin, CAS RN 7696-12-0), 3-phenoxybenzyl-d,l-cis,trans 2,2-dimethyl-3-(2-methyl-propenyl) cyclopropane carboxylate (phenothrin, CAS RN 26002-80-2); (empenthrin, CAS RN 54406-48-3); (cyphenothrin; CAS RN 39515-40-7), (prallethrin, CAS RN 23031-36-9), (imiprothrin, CAS RN 72963-72-5), (RS)-3-allyl-2-methyl-4-oxycyclopent-2-enyl-(1S, 3R, 1R, 3S)-2,2-dimethyl-3-(2-methylprop-1-enyl)cyclopropanecarboxylate (allethrin, CAS RN 584-79-2), (bioallethrin, CAS RN 584-79-2), and (ZXI8901, CAS RN 160791-64-0).

18. The method of claim 15, wherein the pyrethroid comprises a member selected from the group consisting of tefluthrin, lambda cyhalothrin, bifenthrin, permethrin and cyfluthrin.

19. The method of claim 13, wherein the pesticide is selected from the group consisting of pyrethrins, synthetic pyrethroids, azoles, oxadizine insecticides, neonicotinoids, diazoles, triazoles, strobilurin derivatives, organophosphates, pyrrols, pyrazoles, phenyl pyrazoles, diacylhydrazines, biological/fermentation products, carbamates, and mixtures thereof.

20. The method of claim 19, wherein the pesticide comprises an oxidiazine insecticide that is selected from the group consisting of 5-(2-chloropyrid-5-ylmethyl)-3-methyl-4-nitroiminoperhydro-1,3,5-oxadiazine, 5-(2-chlorothiazol-5-ylmethyl)-3-methyl-4-nitroiminoperhydro-1,3,5-oxadiazine, 3-methyl-4-nitroimino-5-(1-oxido-3-pyridinomethyl)perhydro-1,3,5-oxadiazine, 5-(2-chloro-1-oxido-5-pyridiniomethyl)-3-methyl-4-nitroiminoperhydro-1,3,5-oxidiazine; and 3-methyl-5-(2-methylpyrid-5-ylmethyl)-4-nitroiminoperhydro-1,3,5-oxadiazine.

21. The method of claim 19, wherein the pesticide comprises a neonicotinoid insecticide that is selected from the group consisting of acetamiprid, imidacloprid, thiamethoxam, clothianidin, dinotefuran, flonicamid, nithiazine, and thiacloprid.

22. The method of claim 19, wherein the pesticide comprises a neonicotinoid that is selected from the group consisting of thiamethoxam (CAS RN 153719-23-4), acetamiprid ((E)-N-[(6-chloro-3-pyridinyl)methyl]-N'-cyano-N-methyl-eneimidamide, CAS RN 135410-20-7), imidacloprid (1-[(6-chloro-3-pyridinyl)methyl]-N-nitro-2-imidazolidinimime, CAS RN 138261-41-3), nitenpyram (N-[(6-chloro-3-pyridinyl)methyl]-N-ethyl-N'-methyl-2-nitro-1,1-ethenediamine, CAS RN 120738-89-8), clothianidin (TI-435 (N-[(2-chloro-5-thiazoyl)methyl]-N'-methyl-N"-nitro,[C(E)]-(9 Cl)-guanidine, CAS RN 210880-92-5).

23. The method of claim 19, wherein the pesticide comprises a pyrrol, pyrazole, or phenyl pyrazole that is selected from the group consisting of chlorfenapyr (4-bromo-2-(4-chlorophenyl)-1-ethoxymethyl-5-trifluoromethylpyrrole-3-carbonitrile, CAS RN 122453-73-0), fenpyroximate ((E)-1, 1-dimethylethyl-4[[[[(1,3-dimethyl-5-phenoxy-1H-pyrazole-4-yl)methylene]amino]oxy]methyl]benzoate, CAS RN 111812-58-9), tebufenpyrad (4-chloro-N[[4-1,1-dimethylethyl)phenyl]methyl]-3-ethyl-1-methyl-1H-pyrazole-5-carboxamide, CAS RN 119168-77-3), and fipronil (5-amino-[2,6-dichloro-4-(trifluoromethyl)pheny1]-4-[(1R,S)-(trifluoromethyl)sulfinyl]-1H-pyrazole-3-carbonitrile, CAS RN 120068-37-3).

24. The method of claim 19, wherein the pesticide comprises a diacylhydrazine that is selected from the group consisting of halofenozide (4-chlorobenzoate-2-benzoyl-2-(1,1-dimethylethyl)-hydrazide, CAS RN 112226-61-6), methoxyfenozide (RH-2485; N-tert-butyl-N'-(3-methoxy-o-toluoyl)-3,5-xylohydrazide, CAS RN 161050-58-4), and tebufenozide (3,5-dimethylbenzoic acid 1-(1,1-dimethylethyl)-2-(4-ethylbenzoyl)hydrazide, CAS RN 112410-23-8).

25. The method of claim 19, wherein the pesticide comprises a triazole selected from the group consisting of amitrole (CAS RN 61-82-5) and riazamate (ethyl-[[1-[(dimethylamino)carbonyl]-3-(1,1-dimethylethyl)-1H-1,2,4-triazol-5-yl]thio]acetate, CAS RN 112143-82-5).

26. The method of claim 19, wherein the pesticide comprises a biological/fermentation products selected from the group consisting of avermectin (abamectin, CAS RN 71751-41-2) and spinosad (XDE-105, CAS RN 131929-60-7).

27. The method of claim 19, wherein the pesticide comprises an organophosphate insecticide selected from the group consisting of acephate (CAS RN 30560-19-1), chlorpyrifos (CAS RN 2921-88-2), chlorpyrifos-methyl (CAS RN 5598-13-0), diazinon (CAS RN 333-41-5), fenamiphos (CAS RN 22224-92-6), and malathion (CAS RN 121-75-5).

28. The method of claim 15, wherein the pesticide comprises a carbamate insecticide selected from the group consisting of aldicarb (CAS RN 116-06-3), carbaryl (CAS RN 63-25-2), carbofuran (CAS RN 1563-66-2), oxamyl (CAS RN 23135-22-0) and thiodicarb (CAS RN 59669-26-0).

29. The method of claim 13, wherein the pesticide comprises a fungicide.

30. The method of claim 29, wherein the fungicide comprises a triazole fungicide selected from the group consisting of amitrol, azaconazole, bitertanol, bromuconazole, climbazole, clotrimazole, cyproconazole, diclobutrazol, difenoconazole, diniconazole, diniconazole-M, epoxiconazole, etaconazole, fenbuconazole, fluquinconazole, fluotrimazole, flusilazole, flutriafol, furconazole, furconazole-cis, hexaconazole, imibenconazole, ipconazole, metconazole, myclobutanil, paclobutrazol, penconazole, propiconazole, quinconazole, simeconazole, tebuconazole, tetraconazole, triadimefon, triadimenol, triazbutil, triticonazole, 1-(4-fluorophenyl)-2-(1H-1,2,4-triazole-1-yl)ethanone, and mixtures thereof.

31. The method according to claim 29, wherein the fungicide comprises fluquinconazole, simeconazole, tebuconazole, tetraconazole, triticonazole, 1-(4-fluorophenyl)-2-(1H-1,2,4-triazole-1-yl)ethanone, or mixtures thereof.

32. The method according to claim 29, wherein the fungicide comprises fluquinconazole.

33. The method according to claim 29, wherein the fungicide comprises simeconazole.

34. The method according to claim 29, wherein the fungicide comprises tebuconazole.

35. The method according to claim 29, wherein the fungicide comprises tetraconazole.

36. The method according to claim 29, wherein the fungicide comprises triticonazole.

37. The method according to claim 29, wherein the fungicide comprises 1-(4-fluorophenyl)-2-(1H-1,2,4-triazole-1-yl)ethanone.

38. The method according to claim 29, wherein the fungicide comprises a diazole selected from the group consisting of imazalil, oxpoconazole, pefurazoate, prochloraz, trifulmizole, and mixtures thereof.

39. The method according to claim 29, wherein the fungicide comprises a strobilurin type fungicide selected from the group consisting of azoxystrobin, dimoxystrobin, famoxadone, kresoxim-methyl, metominostrobin, picoxystrobin, pyraclostrobin, trifloxystrobin, and mixtures thereof.

40. The method according to claim 30, wherein the fungicide comprises a member selected from the group consisting of tebuconazole, simeconazole, fludioxonil, fluquinconazole, difenoconazole, 4,5-dimethyl-N-(2-propenyl)-2-(trimethylsilyl)-3-thiophenecarboxamide (silthiofam), hexaconazole, etaconazole, propiconazole, triticonazole, flutriafol, epoxiconazole, fenbuconazole, bromuconazole, penconazole, imazalil, tetraconazole, flusilazole, metconazole, diniconazole, myclobutanil, triadimenol, bitertanol, pyremethanil, cyprodinil, tridemorph, fenpropimorph, kresoxim-methyl, azoxystrobin, ZEN90160, fenpiclonil, benalaxyl, furalaxyl, metalaxyl, R-metalaxyl, orfurace, oxadixyl, carboxin, prochloraz, trifulmizole, pyrifenox, acibenzolar-S-methyl, chlorothalonil, cymoaxnil, dimethomorph, famoxadone, quinoxyfen, fenpropidine, spiroxamine, triazoxide, BAS50001 F, hymexazole, pencycuron, fenamidone, guazatine, and cyproconazole.

41. The method according to claim 29, wherein the fungicide comprises silthiofam.

42. The method according to claim 29, wherein the pesticide comprises silthiofam and the polymer comprises polyvinylacetate.

43. The method according to claim 13, wherein the pesticide comprises silthiofam and the polymer comprises methocel.

44. A method of producing an agronomic crop, the method comprising the steps:
  a. providing plant seeds of the agronomic crop that have been treated by the method according to claim 1;
  b. planting the seeds; and
  c. cultivating the planted seeds and plants that sprout from the seeds.

45. Phytotoxic agent-treated plant seed having an improved germination rate, each seed comprising a plant seed having a phytotoxic agent deposited thereupon, and having a uniform polymer coating having a thickness of between about 1 and 500 microns and having between 0% and 20% unfused particles of the polymer in the coating, wherein the coating comprises the polymer in an amount of at least about 50% by weight and where the coating is free of the phytotoxic agent and is located between the seed and the phytotoxic agent, and where the polymer is selected from the group consisting of maltodextrin, methylcellulose, ethylcellulose, hydroxypropylcellulose, hydroxypropyl/methylcellulose, vinyl acetate - ethylene polymers, ethylene-vinyl chloride polymers, vinyl acetate polymers, vinyl-acrylic polymers, starch-based polymers, SB-2000, polyvinyl acetate -vinyl chloride polymers, vinyl chloride/ vinyl acetate/ ethylene copolymers, styrene-acrylate copolymers, vinylacetate polymers, vinylbutyrate polymers, styrene-vinylbutyrate copolymers, acrylate polymers, styrene-butadiene copolymers, vinylacetate-vinylbutyrate copolymers, and vinylacetate-vinylversatate copolymers.

* * * * *

UNITED STATES PATENT AND TRADEMARK OFFICE
CERTIFICATE OF CORRECTION

| | |
|---|---|
| PATENT NO. | : 7,836,630 B2 |
| APPLICATION NO. | : 10/705062 |
| DATED | : November 23, 2010 |
| INVENTOR(S) | : Asrar et al. |

It is certified that error appears in the above-identified patent and that said Letters Patent is hereby corrected as shown below:

Title Page, Item (75) Inventors, replace the term "Vladmir" with the term -- Vladimir --

Page 3, column 1, line 27, replace the term "037689247" with the term -- 03768924.7 --

Column 19, line 61, replace the term "10" with the term -- 10µ --

Signed and Sealed this
Twelfth Day of July, 2011

David J. Kappos
*Director of the United States Patent and Trademark Office*